(12) United States Patent
Inoue

(10) Patent No.: US 6,628,889 B2
(45) Date of Patent: Sep. 30, 2003

(54) EDITING DEVICE, EDITING SYSTEM AND EDITING METHOD

(75) Inventor: Kiyoshi Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/125,058

(22) PCT Filed: Dec. 9, 1997

(86) PCT No.: PCT/JP97/04525

§ 371 (c)(1),
(2), (4) Date: Nov. 23, 1998

(87) PCT Pub. No.: WO98/26421

PCT Pub. Date: Jun. 18, 1998

(65) Prior Publication Data

US 2002/0106187 A1 Aug. 8, 2002

(30) Foreign Application Priority Data

Dec. 9, 1996 (JP) .............................. 8-328906

(51) Int. Cl.⁷ ............................................... H04N 5/93
(52) U.S. Cl. ......................................... 386/52; 386/95
(58) Field of Search .............................. 386/46, 83, 95, 386/52, 55, 65, 68, 121, 125; 345/328; H04N 5/76

(56) References Cited

U.S. PATENT DOCUMENTS

| | | | | |
|---|---|---|---|---|
| 4,802,019 A | * | 1/1989 | Harada et al. ................. | 386/68 |
| 5,404,316 A | | 4/1995 | Klingler et al. | |
| 5,526,132 A | * | 6/1996 | Tsubota et al. ................ | 386/52 |
| 5,546,191 A | * | 8/1996 | Hibi et al. ...................... | 386/83 |
| 5,649,046 A | * | 7/1997 | Stewart et al. ................. | 386/52 |
| 5,786,955 A | * | 7/1998 | Kori et al. ..................... | 386/121 |
| 5,825,967 A | * | 10/1998 | Stewart et al. ................. | 386/52 |
| 5,956,458 A | * | 9/1999 | Sezan et al. .................... | 386/95 |
| 6,018,609 A | * | 1/2000 | Yamada et al. ................ | 386/55 |
| 6,118,925 A | * | 9/2000 | Murata et al. ................. | 386/55 |
| 6,289,167 B1 | * | 9/2001 | Boetje et al. ................... | 386/52 |
| 6,321,024 B1 | * | 11/2001 | Fujita et al. .................... | 386/55 |

FOREIGN PATENT DOCUMENTS

| | | |
|---|---|---|
| JP | 61-66278 | 4/1986 |
| JP | 63-123285 | 5/1988 |
| JP | 2-214082 | 8/1990 |
| JP | 4-117686 | 4/1992 |
| JP | 6-44744 | 2/1994 |
| JP | 6-153130 | 5/1994 |
| JP | 6-343148 | 12/1994 |

* cited by examiner

Primary Examiner—Huy Nguyen
(74) Attorney, Agent, or Firm—Frommer Lawrence & Haug LLP; William S. Frommer; Gordon Kessler

(57) ABSTRACT

Data including video data and audio data recorded on a tape-like recording medium of a video cassette 12 are read, and position information of at least the video data of the data including the video data and the audio data stored in a cassette-appendant memory as temporary storage means of the video cassette 12 is read. The data including the video data and the audio data read from the tape-like recording medium are edited. The position information is relocated, or the position information is relocated while position information is newly prepared, thereby preparing editing data. Thus, a target portion in the case of up-loading the video data and the audio data from the video cassette 12 to an editing device 14 or the like may be designated in a short period of time.

15 Claims, 33 Drawing Sheets

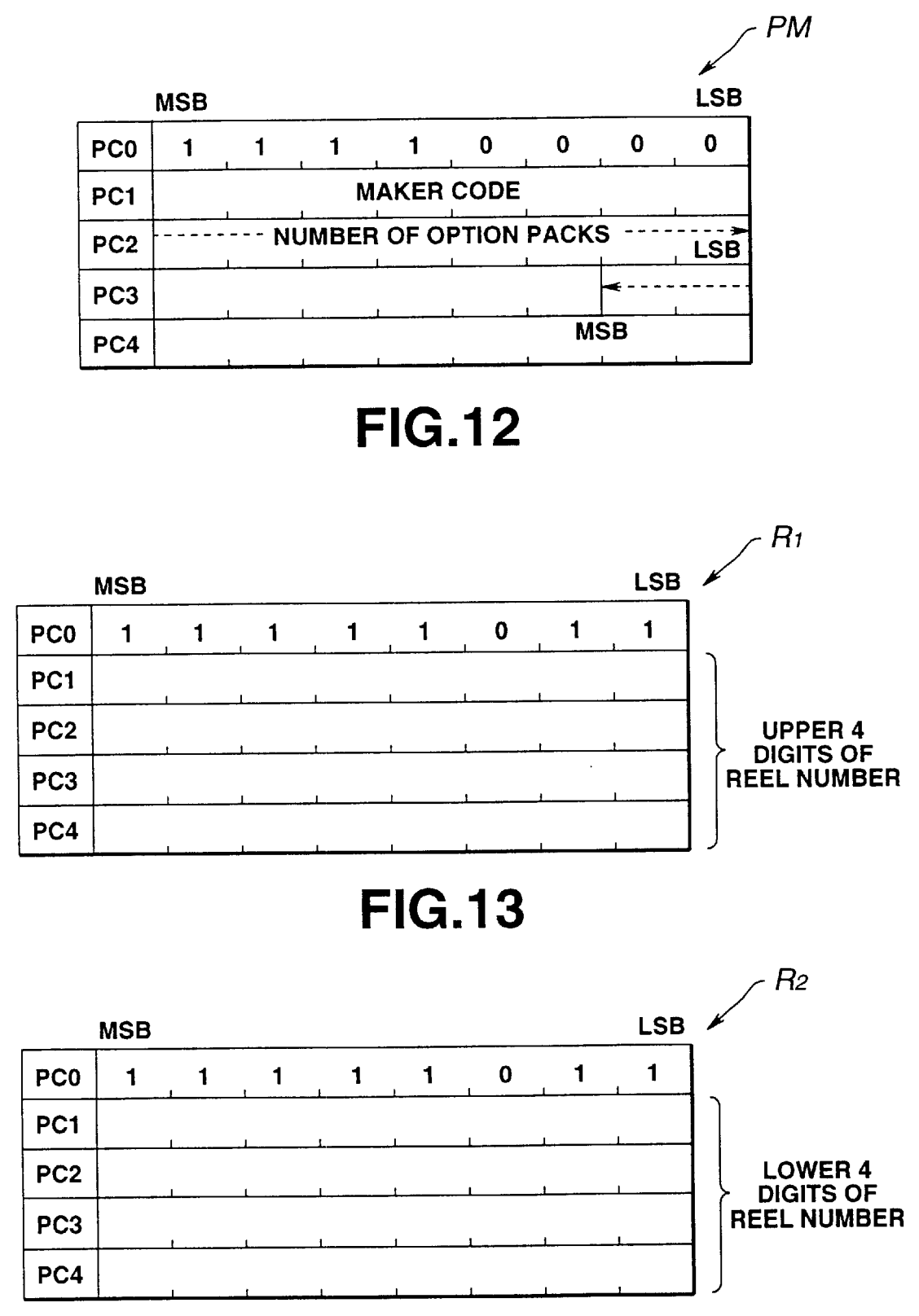

PM

| | MSB | | | | | | | LSB |
|---|---|---|---|---|---|---|---|---|
| PC0 | 1 | 1 | 1 | 1 | 0 | 0 | 0 | 0 |
| PC1 | | | MAKER CODE | | | | | |
| PC2 | | | NUMBER OF OPTION PACKS | | | | | LSB |
| PC3 | | | | | | | | |
| PC4 | | | | | MSB | | | |

| | MSB | | | | | | | LSB |
|---|---|---|---|---|---|---|---|---|
| PC0 | 1 | 1 | 1 | 1 | 1 | 0 | 1 | 1 |
| PC1 | | | | | | | | |
| PC2 | | | | | | | | |
| PC3 | | | | | | | | |
| PC4 | | | | | | | | |

UPPER 4 DIGITS OF REEL NUMBER

| | MSB | | | | | | | LSB |
|---|---|---|---|---|---|---|---|---|
| PC0 | 1 | 1 | 1 | 1 | 1 | 0 | 1 | 1 |
| PC1 | | | | | | | | |
| PC2 | | | | | | | | |
| PC3 | | | | | | | | |
| PC4 | | | | | | | | |

LOWER 4 DIGITS OF REEL NUMBER

FIG.14

| MSB ID0 LSB | | MSB ID1 LSB | | DATA | |
|---|---|---|---|---|---|
| FR | | | | SB NO. | SUBCODE DATA |
| 1 | AP3 | | | 0 | FB (IPadd1) |
| 1 | TAG | ABSOLUTE TRACK NO. | | 1 | FB (IPadd2) |
| 1 | TAG | | | 2 | FB (CUE) |
| 1 | TAG | | | 3 | TTC |
| 1 | TAG | ABSOLUTE TRACK NO. | | 4 | TTC OR BIN OR NO INFO |
| 1 | TAG | | | 5 | TTC |
| 1 | AP3 | | | 6 | FB (IPn1) |
| 1 | TAG | ABSOLUTE TRACK NO. | | 7 | FB (IPn2) |
| 1 | TAG | | | 8 | |
| 1 | TAG | | | 9 | TTC |
| 1 | TAG | ABSOLUTE TRACK NO. | | 10 | TTC OR BIN OR NO INFO |
| 1 | APT | | | 11 | TTC |

FIG.23

| FR | ID0 | | SB NO. | SUBCODE DATA |
|---|---|---|---|---|
| 0 | AP3 | | 0 | F0 (PM) |
| 0 | TAG | ABSOLUTE TRACK NO. | 1 | FB (R1) |
| 0 | TAG | | 2 | FB (R2) |
| 0 | TAG | | 3 | TTC |
| 0 | TAG | ABSOLUTE TRACK NO. | 4 | REC DATE OR NO INFO |
| 0 | TAG | | 5 | REC TIME OR NO INFO |
| 0 | AP3 | | 6 | RESERVE |
| 0 | TAG | ABSOLUTE TRACK NO. | 7 | RESERVE |
| 0 | TAG | | 8 | RESERVE |
| 0 | TAG | | 9 | TTC |
| 0 | TAG | ABSOLUTE TRACK NO. | 10 | REC DATE OR NO INFO |
| 0 | APT | | 11 | REC TIME OR NO INFO |

FIG.24

EDITING DEVICE, EDITING SYSTEM AND EDITING METHOD

TECHNICAL FIELD

This invention relates to an editing device, an editing system and an editing method for editing using video and audio signals recorded on an original material tape.

BACKGROUND ART

Electronic editing for electrically editing video signals by using a video tape has been generally known. This electronic editing is classified into on-line editing for editing by directly using a final recording medium and off-line editing for preparing data for on-line editing.

The off-line editing will now be explained. First, an original material tape is dubbed onto a video tape by using a video tape recorder (VTR) so as to prepare a work tape for editing work. On this work tape, the same tape position information as that of the original tape such as the same time code is recorded. Temporary editing is carried out using this work tape, and editing point information is read out from a recording master tape completed by temporary editing. Thus, a data list for on-line editing (edit decision list or EDL) is prepared. Then, on-line editing is carried out by automatically editing an editing cut on the basis of the EDL.

Meanwhile, in the off-line editing, it has been conventional to first prepare the work tape by copying video and audio signals of the original material tape together with the time code, then select a scene while reproducing the work tape, then prepare a visual reading handwritten list while collating the scene number thereof with an image, and prepare the EDL by temporary editing based on this list. Therefore, it is time-consuming to prepare the EDL. Also, to find a necessary scene on the work tape, troublesome operation of fast feed and rewind of the work tape must be carried out.

Recently, random access and quick access to substantially necessary video and audio signals on the original material tape can be realized, and it is considered to transfer (up-load) the video and audio signals onto a temporary storage medium such as a hard disc drive of good operability by using a graphical user interface (GUI) and carry out temporary editing like the above-described off-line editing on the temporary storage medium. Actually, instead of newly recording the transferred video and audio signals on the hard disc drive in accordance with a temporary editing order, only the editing point information of the video and audio signals is processed, thus enabling so-called non-destructive editing which takes advantage of the above-mentioned random access and quick access characteristics. Then, using a temporary editing file on the hard disc drive based on the editing point information, detailed main editing like the above-described on-line editing is carried out.

However, in carrying out the non-destructive editing, it is time-consuming to designate a portion to be up-loaded onto the hard disc drive from the original material tape.

For example, in editing report images for a news program, it is typical that images during when waiting for appearance of a necessary person are also recorded on the original material tape. For up-loading onto the hard disc drive, images must be extracted by removing such unnecessary portions. However, to find the images from which the unnecessary portions have been removed, form the original material tape at the stage of editing work, a troublesome and time-consuming work of repeating rewind and feed of the tape is required. Therefore, it is time-consuming to designate a portion to be up-loaded onto the hard disc drive.

In view of the foregoing status of the art, it is an object of the present invention to provide an editing device, an editing system and an editing method which enable designation of a portion to be up-loaded in a short period of time.

DISCLOSURE OF THE INVENTION

According to the present invention, there is provided an editing device including: reading means for reading data including video data and audio data recorded on a tape-like recording medium of a tape cassette, and reading position information of at least the video data of the data including the video data and the audio data stored in temporary storage means of the tape cassette; and editing processing means for editing the data including the video data and the audio data read by the reading means, and relocating the position information or relocating the position information while newly preparing position information so as to prepare editing data.

According to the present invention there is also provided an editing system including: a reproducing device for reproducing data including video data and audio data recorded on a tape-like recording medium of a tape cassette, and reproducing position information of at least the video data of the data including the video data and the audio data stored in temporary storage means of the tape cassette; an editing device including reading means for reading the data reproduced from the reproducing device and reading the position information of at least the video data of the data including the video data and the audio data reproduced from the reproducing device, and editing processing means for editing the data including the video data and the audio data read by the reading means and relocating the position information or relocating the position information while newly preparing position information so as to prepare editing data; and a transmission material preparing device supplied with the editing data prepared by the editing processing means and preparing video and audio transmission materials.

According to the present invention, there is also provided an editing method including: a first step of reading data including video data and audio data recorded on a tape-like recording medium of a tape cassette, and reading position information of at least the video data of the data including the video data and the audio data stored in temporary storage means of the tape cassette; and a second step of editing the data including the video data and the audio data read at the first step, and relocating the position information or relocating the position information while newly preparing position information so as to prepare editing data.

According to the present invention, there is further provided an editing method including: a firs step of reproducing data including video data and audio data recorded on a tape-like recording medium of a tape cassette, and reproducing position information of at least the video data of the data including the video data and the audio data stored in temporary storage means of the tape cassette; a second step of reading the data reproduced at the first step and reading the position information of at least the video data of the data including the video data and the audio data reproduced at the first step; a third step of editing the data read at the second step and relocating the position information or relocating the position information while newly preparing position information so as to prepare editing data; and a fourth step of preparing video and audio transmission materials from the editing data prepared at the third step.

BRIEF DESCRIPTION OF THE DRAWINGS

FIG. 12 is a view showing contents of a management pack PM related to an index picture used in the embodiment of the present invention.

FIG. 13 is a view showing contents of a reel pack P1.

FIG. 14 is a view showing contents of a reel pack P2.

FIG. 23 is a view showing the data structure of an ID portion or the like of the block constituting the subcode.

FIG. 24 is a view showing the data structure of another ID portion or the like of the block constituting the subcode.

BEST MODE FOR CARRYING OUT THE INVENTION

Figure 1:
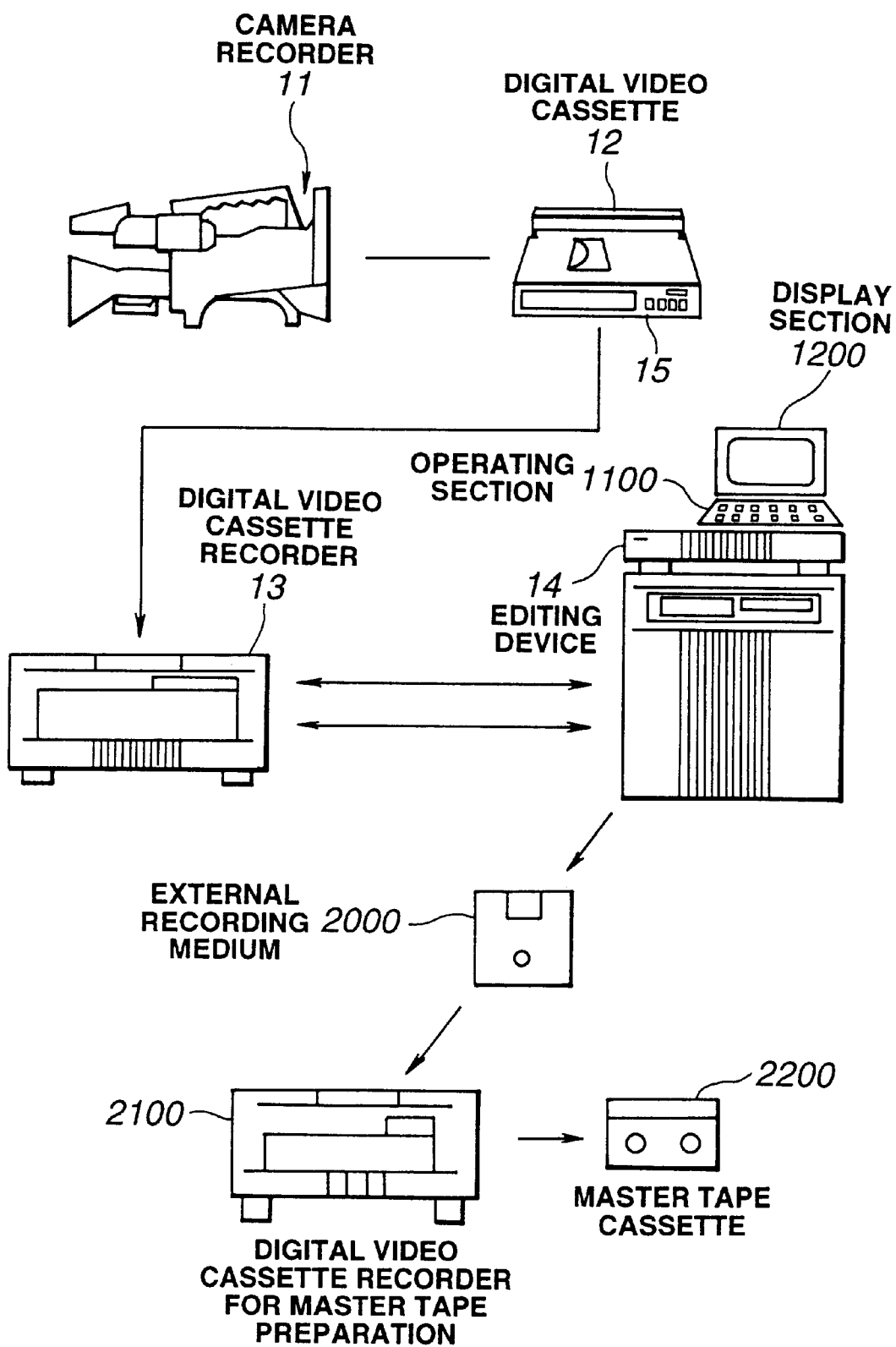
FIG. 1 is a view showing an entire editing system of an embodiment of the present invention.

A preferred embodiment of the present invention will now be described in detail with reference to the drawings.

In this embodiment, so-called non-linear non-destructive editing is carried out by up-loading a necessary portion of original video and audio signals recorded on an original material tape onto a hard disc drive as a kind of temporary recording medium.

First, the structure of an entire editing system of this embodiment will be described with reference to FIG. 1. This system includes a camera recorder 11 having a digital video camera section and a digital VTR section for recording video signals obtained on shooting by the digital video camera onto a digital video cassette 12 as digital signals, a digital video cassette recorder 13 for carrying out reproduction or the like of the video signals recorded on the digital video cassette 12, and an editing device 14 for carrying out non-linear editing by using information from the digital video cassette recorder 13.

This system also includes a digital video cassette recorder for master tape preparation 2100 for preparing a master tape 2200, using editing data of the video and audio signals edited by the editing device 14 through an external recording medium 2000.

The digital video camera section and the digital VTR section of the camera recorder 11 may be integrated or separable. The digital video cassette 12 uses a video tape with a width of 6.3 mm (¼ inches), for example, and has a cassette-appendant memory (not shown in FIG. 1) using a semiconductor memory within the cassette. The digital video cassette 12 also has a terminal 15 on the back side thereof for connecting the cassette-appendant memory to an external circuit. In this embodiment, the digital video cassette recorder 13 shown in FIG. 1 corresponds to simplified index picture preparation means of the present invention, and the editing device 14 and the digital video cassette recorder 13 correspond to simplified index picture adding means of the present invention. The editing device 14 corresponds to video handling means.

The camera recorder 11, the structure of various data recorded on the digital video cassette 12, and the digital video cassette recorder 13 will be first described.

Structure of Camera Recorder 11

Figure 2:
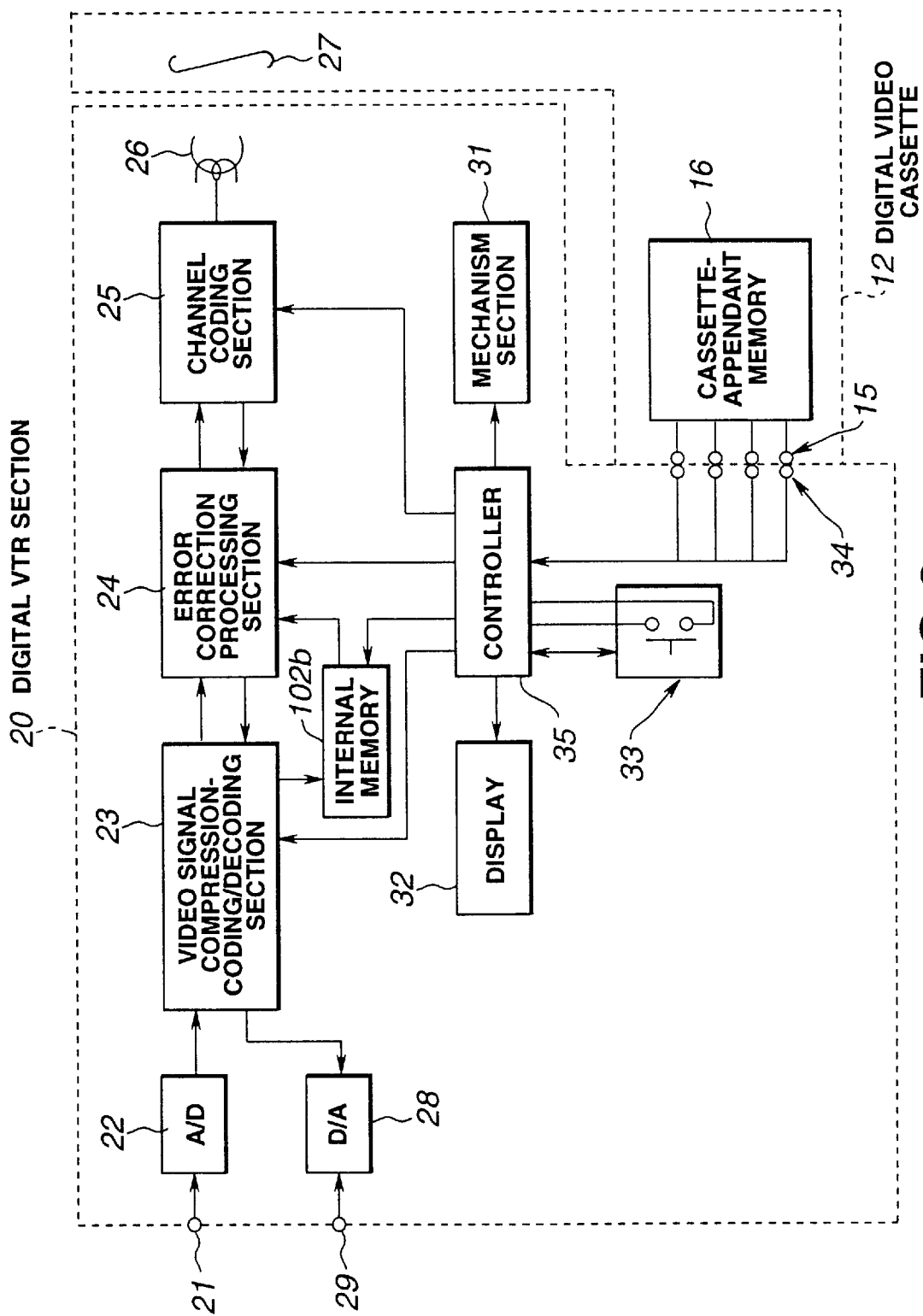
FIG. 2 is a block diagram showing the structure of a digital VTR section in a camera recorder of the editing system.

FIG. 2 is a block diagram showing the structure of the digital VTR section of the camera recorder 11 shown in FIG. 1. This digital VTR section 20 includes an input terminal 21 for inputting video signals from the digital video camera section, an output terminal 29 for outputting video signals, an A/D converter 22 for carrying out analog-digital (A/D) conversion of the video signals inputted from the input terminal 21, a video signal compression coding/decoding section 23 for carrying out compression-coding of the video signals outputted from the A/D converter 22 and decoding (expansion) processing of signals reproduced from the video tape, and a D/A converter 28 for carrying out digital-analog (D/A) conversion of the signals decoded by the video signal compression-coding/decoding section 23 and outputting the converted signals to the output terminal 29. The video signal compression-coding/decoding section 23 carries out compression coding by using discrete cosine transform (hereinafter referred to as DCT).

The digital VTR section 20 also includes an error correction processing section 24 for appending an error correction code to the signals compression-coded by the video signal compression-coding/decoding section 23, and carrying out error correction processing on the signals reproduced from the video tape so as to output the error-corrected signals to the video signal compression-coding/decoding section 23. The digital VTR section 20 also includes a channel coding section 25 for carrying out coding processing suitable for recording with respect to the signals having the error correction code added thereto by the error correction processing section 24, and carrying out decoding processing corresponding to the coding processing with respect to the signals reproduced from the video tape so as to output the decoded signals to the error correction processing section 24. The digital VTR section 20 also includes a video head 26 for recording the signals coded by the channel coding section 25 onto the video tape 27 in the digital video cassette 12, and reproducing the signals recorded on the video tape 27 so as to output the reproduced signals to the channel coding section 25. The video head 26 includes a recording head and a reproducing head and is thus capable of carrying out recording and reproduction simultaneously.

The digital VTR section 20 further includes a mechanism section 31 for loading the digital video cassette 12 and driving a rotary drum mounted on the video head 26, a display 32 for carrying out various displays, an operating section 33 for a user to carry out various operations, a terminal 34 for connection to the terminal 15 connected with the cassette-appendant memory 16 in the digital video cassette 12, and a controller 35 connected with the video signal compression-coding/decoding section 23, the error correction processing section 24, the channel coding section 25, the mechanism section 31, the display 32, the operating section 33 and the terminal 34.

The operating section 33 has plural switches for carrying out predetermined indications. In this embodiment, these switches include a mark-in switch for indicating a start point, that is, a mark-in point of an effective area in each scene or take, a mark-out point for indicating an end point, that is, a mark-out point of the effective area in each scene or take, an OK/NG switch for indicating OK or NG (no good) with respect to each scene or take, a take switch for indicating a take number, a cue switch for indicating a cue point as an index for arbitrary designation by the user, and a mode changeover switch for switching a mark mode and a cue mode as later described. Every time the OK/NG switch is pressed, an OK indication state and an NG indication state are switched. The take number makes increment every time the take switch is pressed. Although no switch for indicating the scene number is provided, the scene number automatically makes increment for every scene. The mark mode enables the user to arbitrarily designate the mark-in point and the mark-out point by using the mark-in switch and the mark-out switch. The cue mode enables the user to arbitrarily designate the cue point by using the cue switch. In the cue mode, the shooting start time point and the shooting end time point of each scene automatically become the mark-in point and the mark-out point, respectively. The operating section 33 may be integrally provided on the camera recorder 11 or may be provided as a remote control device. The mark-in point is used as an in-point of a material used for editing.

The controller 35 includes a CPU (central processing unit), a ROM (read only memory), a RAM (random access memory), and an input/output section. By executing a program stored in the ROM using the RAM as a working area, the controller 35 controls the entire digital VTR section 20.

The digital VTR section 20 is provided with an internal memory 102b for storing index pictures. By operating the various switches of the operating section 33, a frame (index picture) at a point indicated for operation is stored in the internal memory 102b. Alternatively, frames of each scene are automatically stored in the internal memory 102b.

On completion of shooting, index pictures $I_{P1}, I_{P2}, I_{P3}, \ldots I_{Pn}$ of all scenes $S_1, S_2, S_3, \ldots S_n$ are written in a recording space subsequent to the final scene on the tape from the internal memory 102b. The index pictures will be described later.

Structure of Digital Video Cassette Recorder 13

Figure 3:
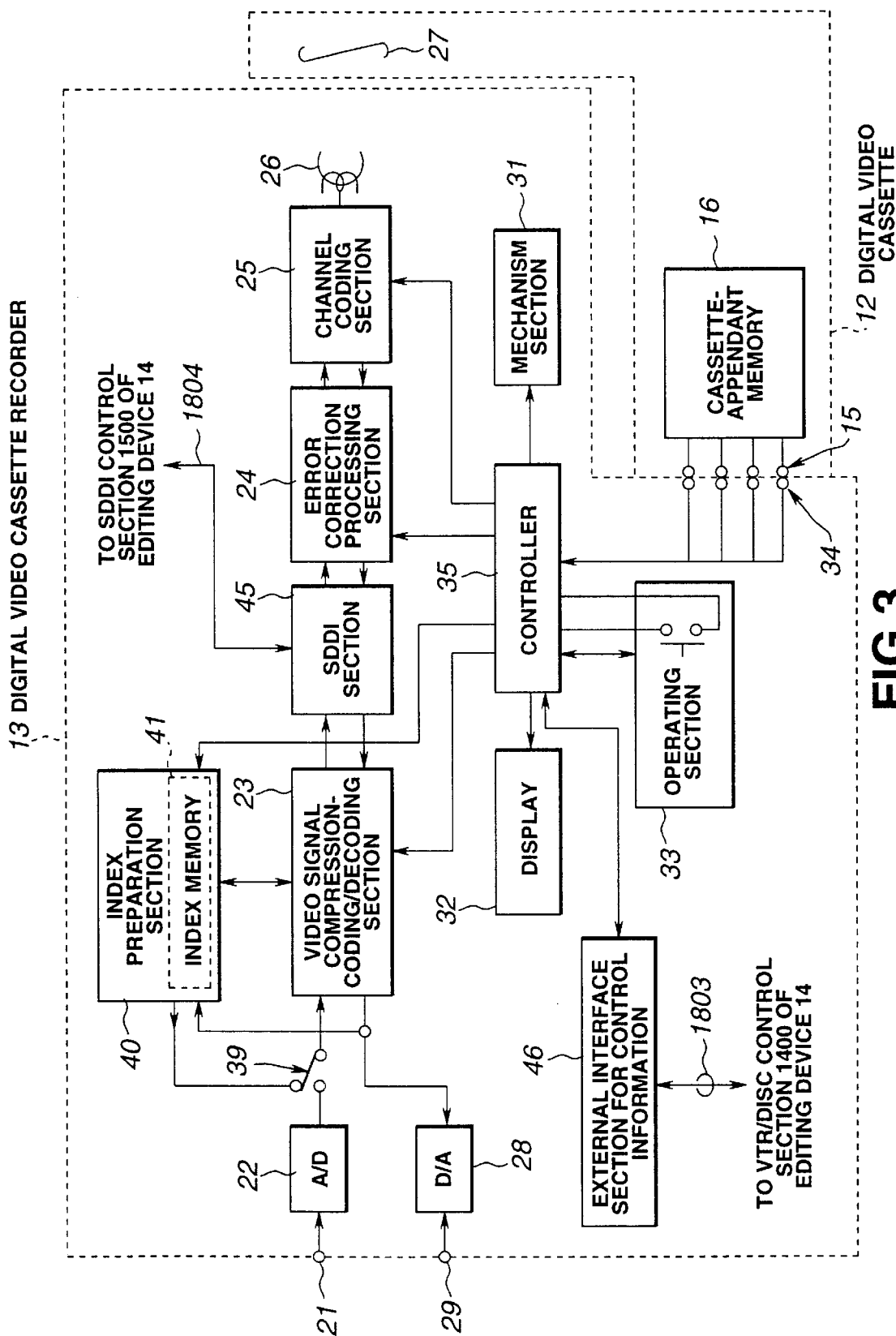
FIG. 3 is a block diagram showing the structure of a digital video cassette recorder of the editing system.

FIG. 3 is a block diagram showing the structure of the digital video cassette recorder 13 shown in FIG. 1. The major structure of digital video cassette recorder 13 is similar to the structure of the digital VTR section 20 shown in FIG. 2. Therefore, the constituent elements similar to those of the digital VTR section 20 are denoted by the same reference numerals and will not be described further in detail. The structure of the digital video cassette recorder 13 differs from that of the digital VTR section 20 in the following points. That is, the digital video cassette recorder 13 additionally has an index preparation section 40, a switch 39 for selecting one of output signals of the index preparation section 40 and the A/D converter 22 and outputting the selected output signal to the video signal compression-coding/decoding section 23, an external interface section for video, audio and subcode information (hereinafter referred to as SDDI or serial digital data interface section) 45 provided between the video signal compression-coding/decoding section 23 and the error correction processing section 24, and an external interface section for control information 46 connected with the controller 35. Also, a function to indicate preparation of index information is appended to the operating section 33.

The index preparation section 40 has a memory controller (not shown) and an index memory 41, where signals to be outputted from the video signal compression-coding/decoding section 23 to the D/A converter 28 are inputted. The index preparation section 40 is controlled by the controller 35, and carries out transmission/reception of predetermined data as later described, to/from the video signal compression-coding/decoding section 23.

The SDDI section 45 is connected to an SDDI control section 1500 of the editing device 14 by an SDDI cable 1804, as later described, thus enabling transmission/reception of video data, audio data and subcode data. The SDDI section 45 also includes an internal switch (not shown) for switching the operation to input an output from the video signal compression-coding/decoding section 23 to the error correction processing section 24 and the operation to input video data and the like received from the editing device 14 to the error correction processing section 24 in response to the command from the controller 35. On the other hand, an output from the error correction processing section 24 is supplied both to the video signal compression-coding/decoding section 23 and to the SDDI section 45.

The external interface section for control information 46 is connected to a VTR/Disc control section 1400 of the editing device 14, thus enabling transmission/reception of various control information through the VTR/Disc control section 1400 and transmission/reception of appendant information such as the mark-in point, the mark-out point and OK/NG.

The controller 35 and the index preparation section 40 select an index picture as an auxiliary index picture in editing from video information recorded on the video tape 27, on the basis of additional information such as the mark-in point, the mark-out point, OK/NG, the take number, the cue point and the scene number, and prepare index picture information for simply displaying the index picture so as to carry out the operation to record the index picture information onto the video tape 27, as later described in detail. In this embodiment, the index picture information is information representing a picture such that plural index pictured (hereinafter referred to as simplified index pictures) compressed and reduced from the individual index pictures are arrayed in one frame. In other words, the index picture information is picture information representing an aggregate screen of the simplified index pictures. The information representing the mark-in point, the mark-out point and the cue point correspond to index information of the present invention, and the index pictures correspond to index pictures of the present invention. The simplified index pictures correspond to simplified index pictures of the present invention. In the following description, the index picture will be referred to IP.

In this embodiment, when the video information is to be recorded onto the video tape 27 by the digital VTR section 20 shown in FIG. 2, or when the video information recorded on the video tape 27 is to be reproduced by the digital VTR section 20 or the digital video cassette recorder 13 shown in FIG. 3, the mark-in point, the mark-out point, OK/NG, the take number and the cue point may be indicated by using the operating section 33. Such indicated information and the information of the scene number are recorded onto the cassette-appendant memory 16 and the video tape 27 in the digital video cassette 12.

Structure of Digital Video Cassette 12

Figure 4:
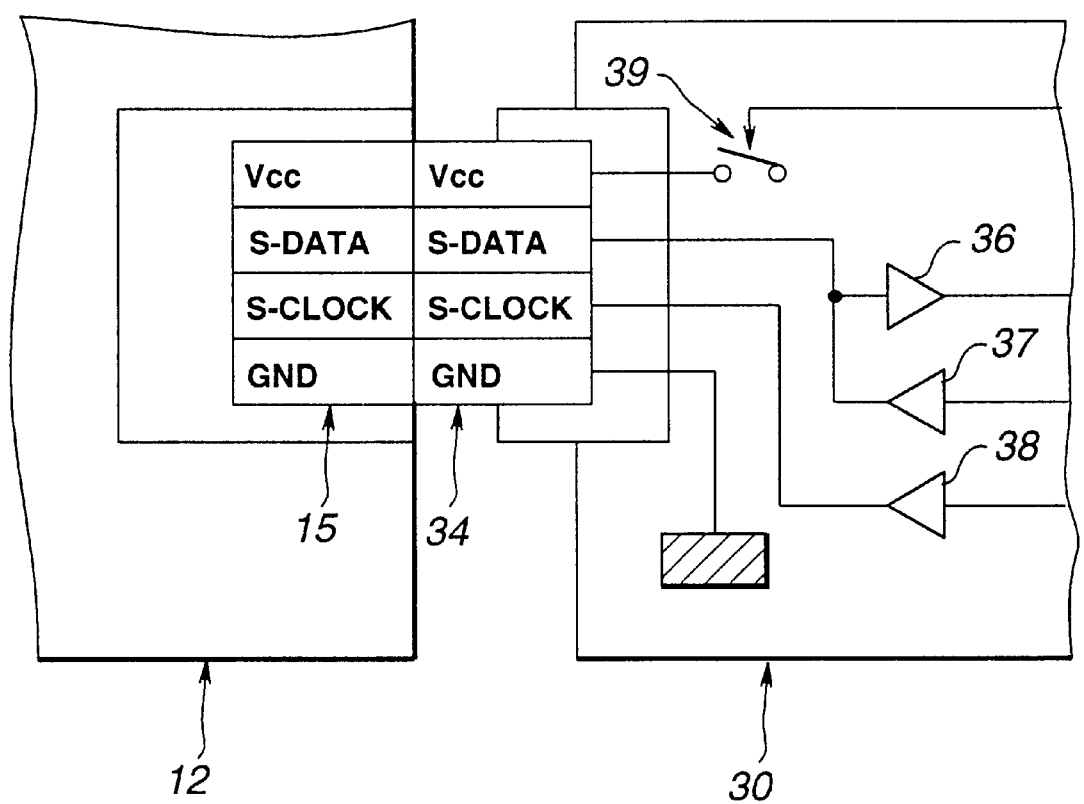
FIG. 4 is a view showing communication means with a cassette-appendant memory in a digital video cassette of the editing system.

Referring to FIG. 4, an example of communication means between the cassette-appendant memory 16 in the digital video cassette 12 and the digital VTR section 20 or the digital video cassette recorder 13 (hereinafter, the digital VTR section 20 or the digital video cassette recorder 13 will be referred to as a main frame 30) will be explained.

FIG. 4 shows an example of the structure of the terminal 15 on the side of the digital video cassette 12 and the terminal 34 on the side of the main frame 30, and the structure of the interface on the side of the main frame 30. The main frame 30 in this example is the digital VTR section 20 of the camera recorder 11 shown in FIG. 2 or the digital video cassette recorder 13 shown in FIG. 3. In this example, the terminals 15, 34 are made up of four pins each. The four pins include a power supply (VCC) pin, a serial (S-DATA) pin, a serial clock (S-CLOCK) pin, and a ground (GND) pin. The corresponding pins are connected with each other. Power and serial clocks are supplied from the main frame 30. The ground pin is grounded on the side of the main frame 30. The serial data pin is used for both input and output. The interface on the side of the main frame 30 includes a input buffer 36 for waveform shaping with its input end connected with the serial data pin, an output buffer 37 for waveform shaping with its output end connected with the serial data pin, a serial clock buffer 38 having its output end connected with the serial clock pin, and a switch 39 having one end connected with the power supply pin and the other end connected with a power supply circuit in the main frame 30. The main frame 30 has a function to control the on-off control action of the power supplied to the digital video cassette 12, by using the switch 39. This function is for resetting the cassette-appendant memory 16.

Figure 5:
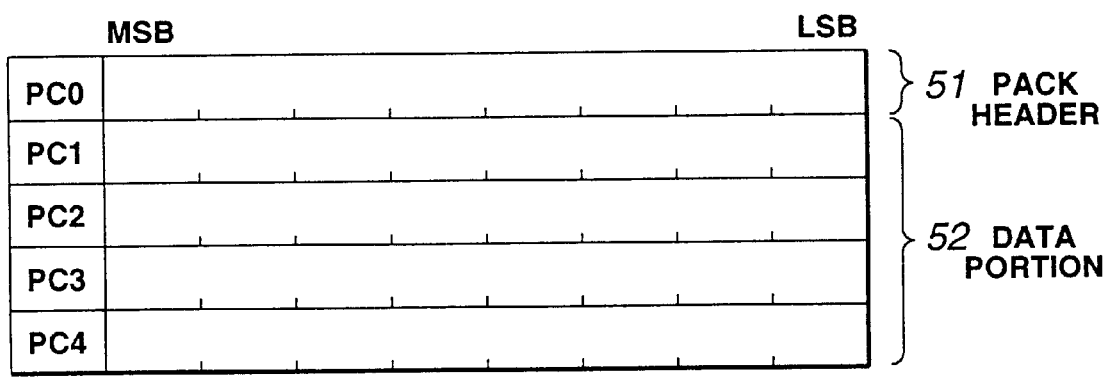
FIG. 5 is a view showing the structure of a data pack stored in the cassette-appendant memory.

Referring to FIGS. 5 to 14, data to be recorded onto the cassette-appendant memory 16 will now be described. First, FIG. 5 shows the structure of a pack as a unit of data to be recorded onto the cassette-appendant memory 16. This pack includes five bytes, composed of a pack header portion 51 of one byte and a data portion 52 of four bytes. The contents of the pack header 51 vary, depending on the type of command. In FIG. 5, LSB expresses the least significant bit and MSB expresses the most significant bit.

Figure 6:
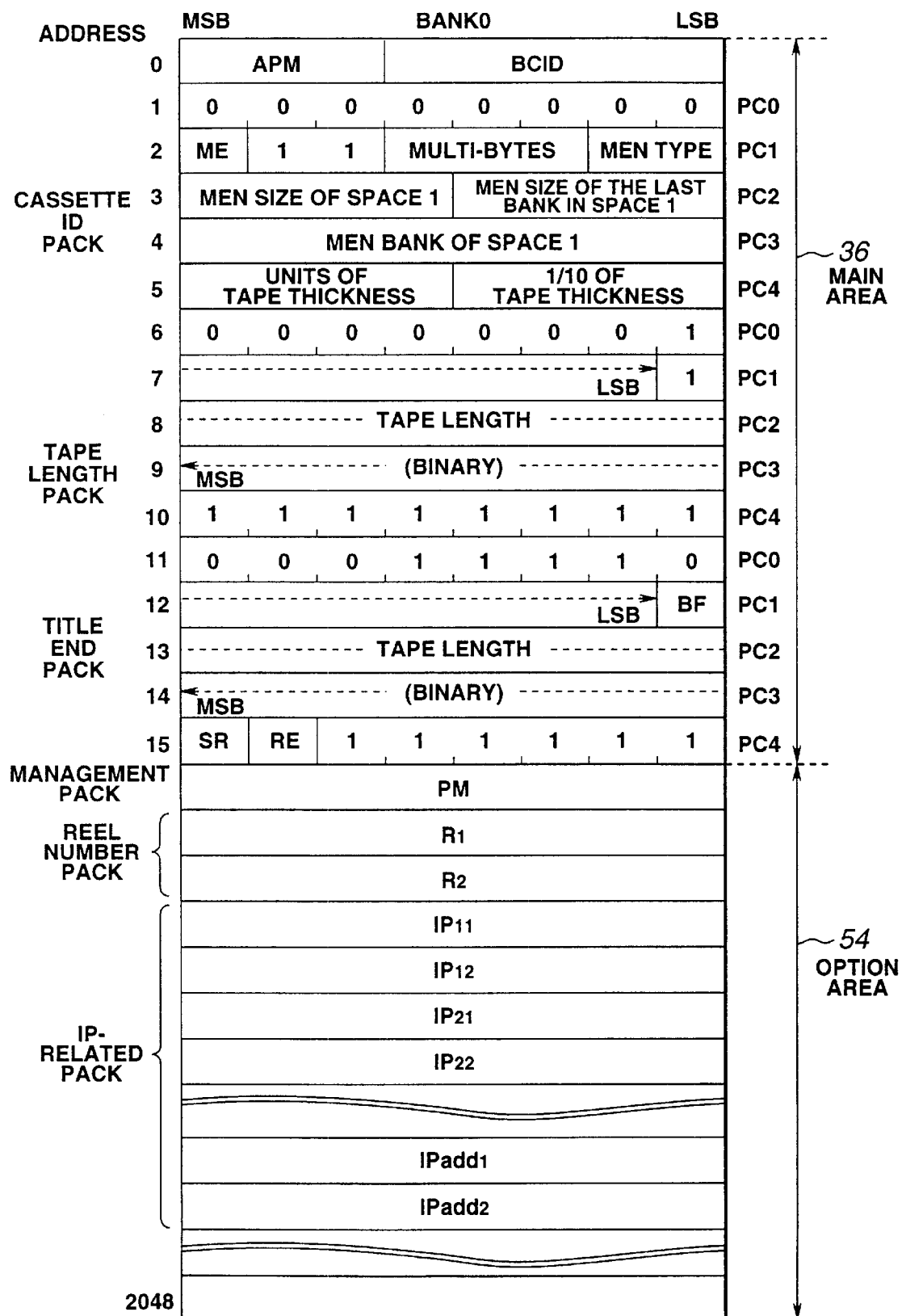
FIG. 6 is a view showing a data format of the cassette-appendant memory.

FIG. 6 shows a data format of the cassette-appendant memory 16. This data format has a main area 53 and an option area 54. The contents of the main area 53 are not directly related to this invention and therefore will not be described further. The format shown in FIG. 6 is prescribed by the "Specifications of Consumer-Use Digital VCRs Using 6.3 mm Magnetic Tape" (so-called blue book).

Information related to the digital video cassette and the index pictures is recorded on the pack basis (hereinafter referred to as IP-related pack) into the option area 54. In this embodiment, a management pack PM including management information such as a maker code and the total number of option packs as later described is prescribed. Also, as a pack related to management of the digital video cassette 12, reel number packs R1, R2 expressing the reel number (cassette number) are prescribed. As the IP-related pack, packs $IP_{n1}$, $IP_{n2}$ related to information of mark-in and mark-out (where n=1, 2, . . . , and n makes increment in accordance with switching of the scene or take), packs $IP_{add1}$, $IP_{add2}$ related to information for specifying the address (recording position) on the video tape 27 of the index picture information as picture information of the index picture aggregate screen, and a pack CUEn related to address information on the video tape 27 in the case where the user has pressed the cue point, are prescribed. In this embodiment, the contents of the pack header of the management pack are set as "F0h", and the contents of the pack header of the reel number pack and the IP-related pack are set as "FBh".

FIGS. 7 to 11 show the outline of the contents of the IP-related packs $IP_{n1}$, $IP_{n2}$, $IP_{add1}$, $IP_{add2}$. Each of these IP-related packs is composed of the header portion 51 and the data portion 52.

Figure 7:
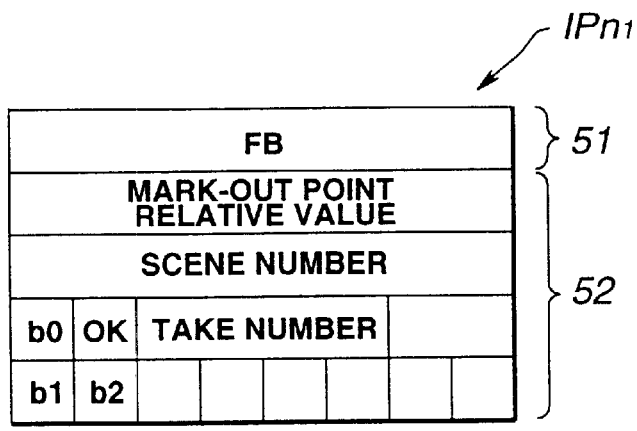
FIG. 7 is a view showing contents of a pack $IP_{n1}$ related to an index picture used in the embodiment of the present invention.
Figure 8:
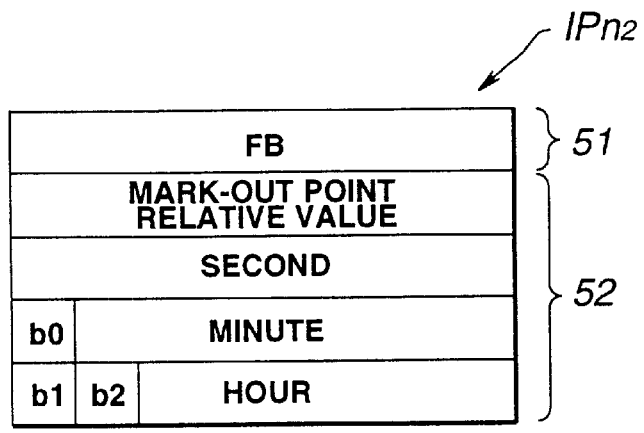
FIG. 8 is a view showing contents of a pack $IP_{n2}$ related to an index picture used in the embodiment of the present invention.

FIG. 7 schematically shows the contents of the pack $IP_{n1}$. In this pack $IP_{n1}$, upper one byte of the mark-out point relative value, the scene number, the take number, and a flag indicating OK/NG (indicating "OK" in FIG. 7) are recorded in the data portion 52. FIG. 8 schematically shows the contents of the pack $IP_{n2}$. In this pack $IP_{n2}$, lower one byte of the mark-out point relative value and a time code (hour, minute, second) of the mark-in point are recorded in the data portion 52. The time code is position information (time information) proper to each frame recorded on the tape.

The mark-out point relative value represents the relative value of the time code of the mark-out point from the mark-in point, and is expressed by upper one byte of the pack $IP_{n1}$ and lower one byte of the pack $IP_{n2}$, that is, two bytes in total. The maximum value of the scene number is 999, and the maximum value of the take number is 15. The flag indicating OK/NG expresses OK by "1" and NG by "0".

Figure 9:
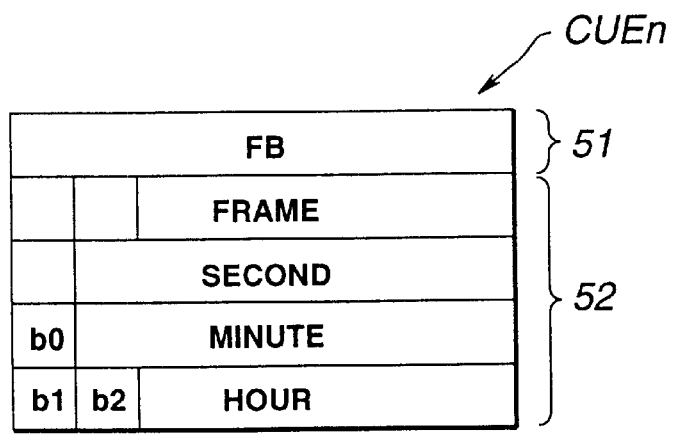
FIG. 9 is a view showing contents of a pack $CUE_n$ related to an index picture used in the embodiment of the present invention.

FIG. 9 schematically shows the contents of the pack CUEn. In this pack CUEn, a time code (hour, minute, second) of the cue point is recorded in the data portion 52.

Figure 10:
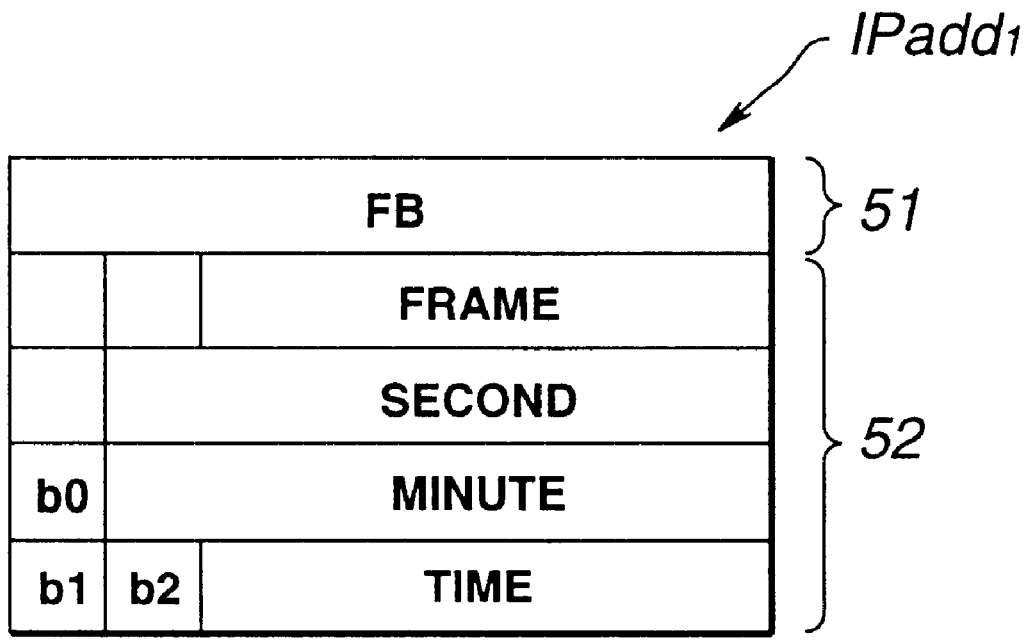
FIG. 10 is a view showing contents of a pack $IP_{add1}$ related to an index picture used in the embodiment of the present invention.
Figure 11:
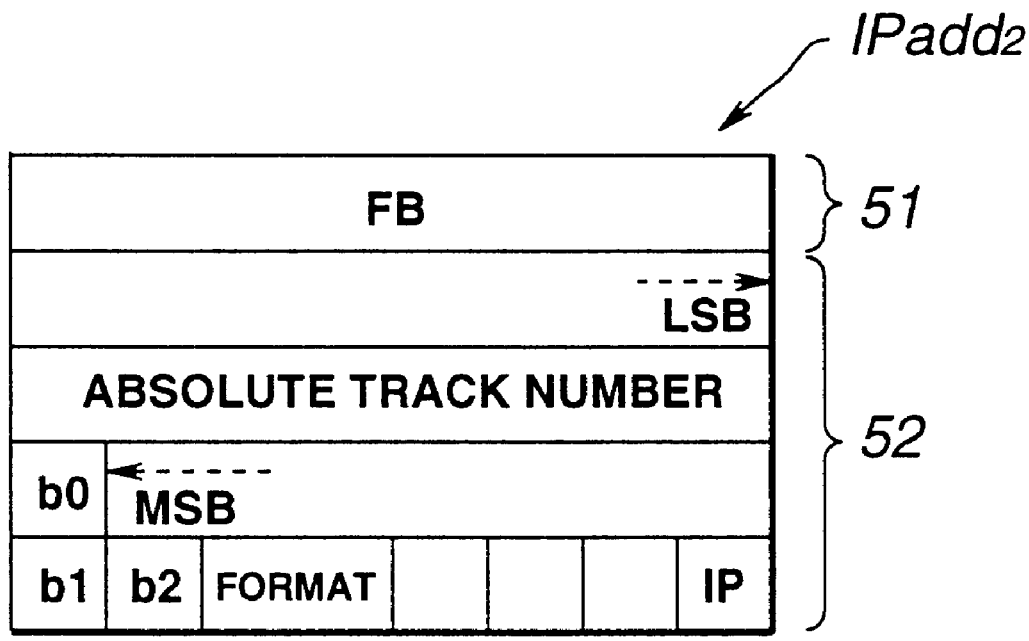
FIG. 11 is a view showing contents of a pack $IP_{add2}$ related to an index picture used in the embodiment of the present invention.

FIG. 10 schematically shows the contents of the pack $IP_{add1}$. In this pack $IP_{add1}$, a time code (hour, minute, second, frame) indicating the recording position of the index picture information on the video tape 27 is recorded in the data portion 52. FIG. 11 schematically shows the contents of the pack $IP_{add2}$. In this pack $IP_{add2}$, an absolute track number indicating the recording position of the index picture information on the video tape 27 is recorded in the data portion 52, as relief means at the time of time code duplication.

In FIGS. 7 to 11, three bits expressed as b2, b1, b0 are used as a sub-header. A sub-header of 0, 0, 0 expresses the pack $IP_{add1}$, and a sub-header of 0, 0, 1 expresses the pack $IP_{add2}$. A sub-header of 0, 1, 0 expresses the pack $IP_{n2}$, and a sub-header of 1, 0, 0 expresses the pack CUEn.

FIG. 12 shows the contents of the management pack PM related to the index picture used in this embodiment. FIG. 13 shows the contents of the reel pack P1. FIG. 14 shows the contents of the reel pack P2.

Referring to FIGS. 15 to 22, data to be recorded on the video tape 27 will be described. In this embodiment, it is assumed that NTSC signals are recorded and reproduced.

Figure 15:
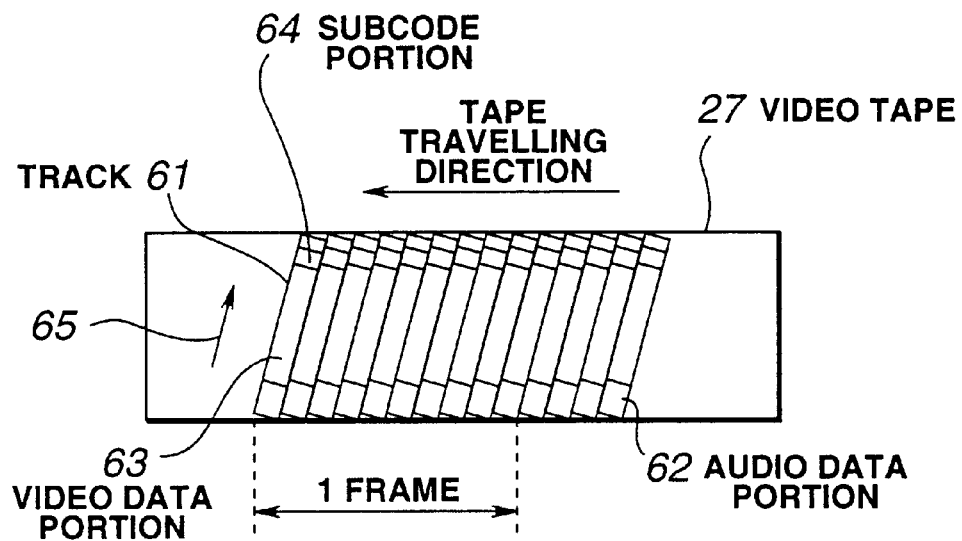
FIG. 15 is a view showing a recording pattern on a video tape of the digital video cassette shown in FIG. 1.

FIG. 15 shows a recording pattern on the video tape 27. On the video tape 27, one frame consists of 10 tracks. Each track 61 has an audio data portion 62, a video data portion 63 and a subcode portion 64. In FIG. 15, an arrow 65 indicates the traveling direction of the head, that is, the order of recording and reproduction of data.

Figure 16:
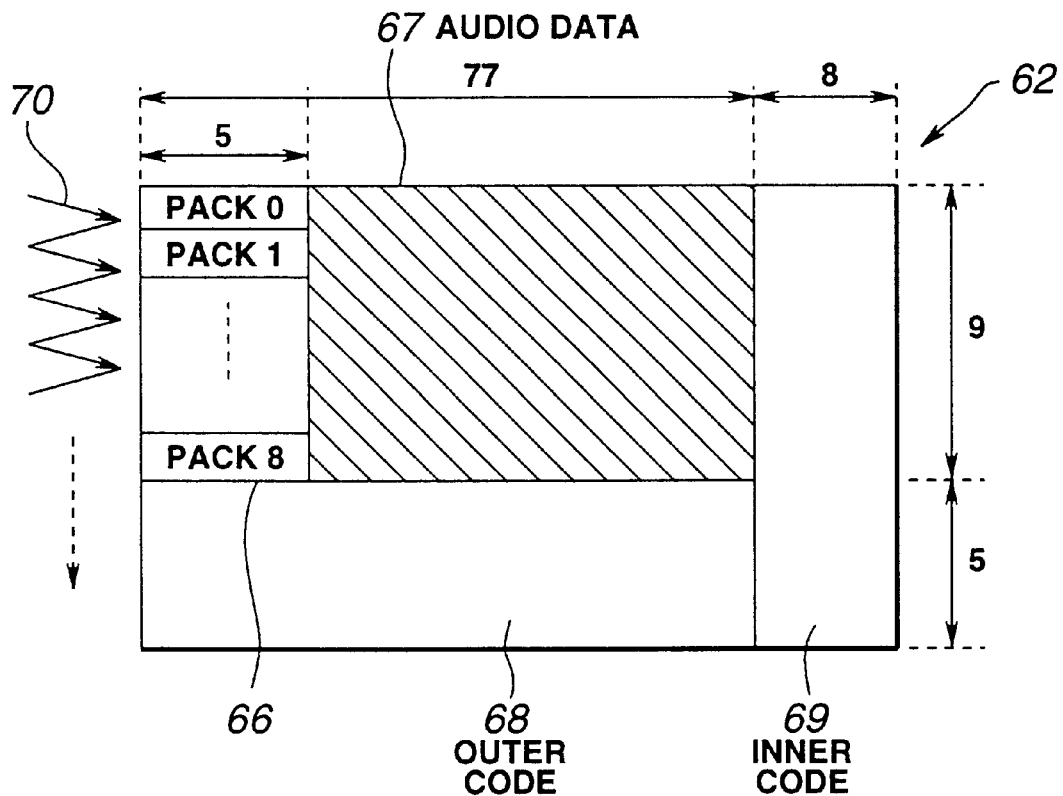
FIG. 16 is a view showing the recording structure of data recorded in an audio data portion.

FIG. 16 shows the structure of one track of data recorded in the audio data portion 62 of FIG. 15. In the audio data portion 62, data including a block of 77×9 bytes composed of audio auxiliary data 66 of 5×9 bytes and audio data 67 of 72×9 bytes, with an outer code 68 of 77×5 bytes appended thereto and with an inner code 69 of 8×14 bytes further appended thereto, is recorded. In FIG. 16, an arrow 70 indicates the direction of recording and reproduction.

Audio auxiliary data recorded as the audio auxiliary data 66 is auxiliary data such as the sampling frequency, the number of quantization bits, the recording date and the recording hour, minute and second of the audio data. These auxiliary data are recorded at a position (for six packs) having a predetermined pack number of each pack in an auxiliary data area. When the user independently records management information, recording of other three packs (actually 12 bytes excluding the pack header) is possible.

For example, with respect to audio data of 16 bits having a sampling frequency of 48 kHz, data for a first channel is interleaved and recorded on the former five tracks in one frame (10 tracks), and data for a second channel is interleaved and recorded on the remaining five tracks.

Figure 17:
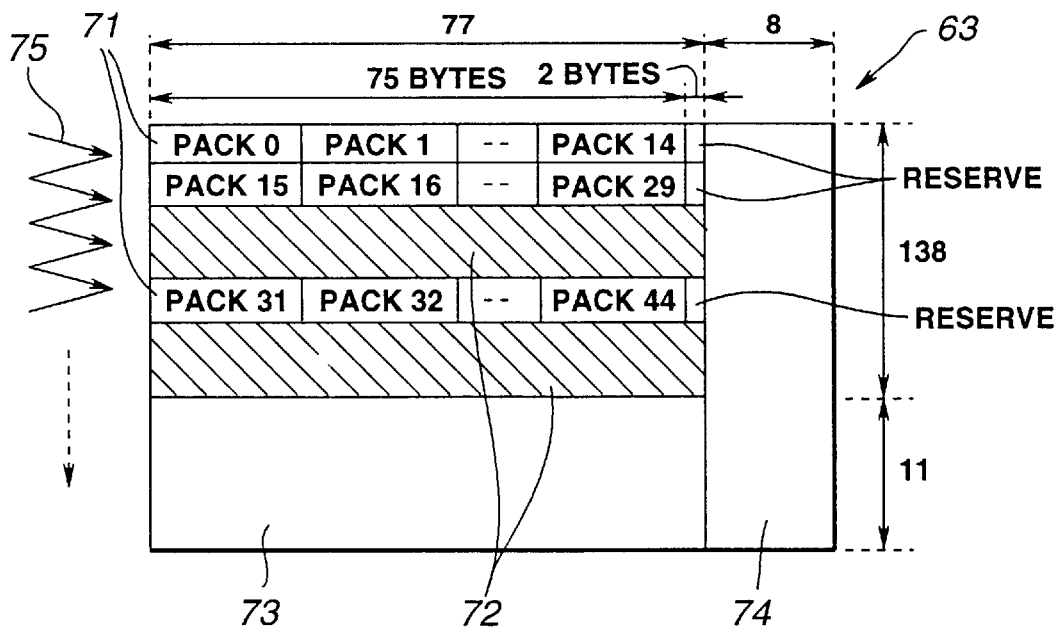
FIG. 17 is a view showing the recording structure of data recorded in a video data portion.

FIG. 17 shows the structure of one track of data recorded in the video data portion 63 of FIG. 15. As shown in FIG. 17, in the video data portion 63, data including a block of 77×138 bytes composed of video auxiliary data 71 of 77×(2+1) bytes and video data 72 of 77×135 bytes, with an outer code 73 of 77×11 bytes appended thereto and with an inner code 74 of 8×149 bytes further appended thereto, is recorded. In FIG. 17, an arrow 75 indicates the direction of recording and reproduction.

The video auxiliary data recorded in the video auxiliary data area is data such as the television broadcast system, the television channel, the recording date and the recording hour, minute and second. As shown in FIG. 17, these auxiliary data are inserted (for six packs similar to the audio auxiliary data) at a position having a predetermined pack number of each pack in the auxiliary data area 71. When the user wishes to insert auxiliary data independently, the auxiliary data may be inserted (for 156 bytes in 39 packs) at a position other than the predetermined position.

Figure 18:
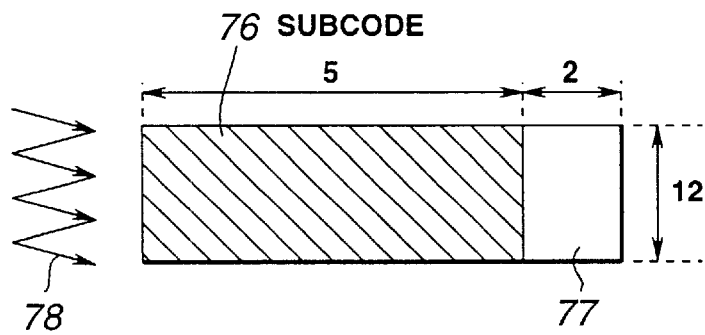
FIG. 18 is a view showing the recording structure of data recorded in a subcode portion.

FIG. 18 shows the structure of data to be recorded in the subcode portion 64 of FIG. 15. In the subcode portion 64, data including a subcode 76 of 5×12 bytes with an inner code 77 of 2×12 bytes appended thereto is recorded. In FIG. 18, an arrow 78 indicates the direction of recording and reproduction.

The subcode recorded in the subcode portion 64 is data indicating video and audio management information such as the absolute track number for high-speed search for the leading part. Similar to the video and audio auxiliary data areas 71, 60, the subcode portion 64 secures an area which enables the user to utilize independently, and allows recording of six packs, that is, 24 bytes excluding the pack header.

Figure 19:
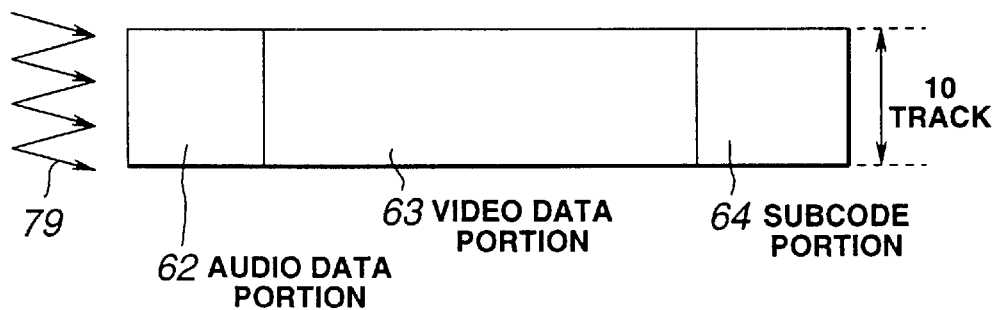
FIG. 19 is a view showing the recording position of each data on the video tape.

FIG. 19 shows the layout of the audio data portion 62, the video data portion 63 and the subcode portion 64 on the video tape 27. In FIG. 19, an arrow 79 indicates the direction of recording and reproduction. On the video tape 27, as shown in FIG. 19, the audio data portion 62, the video data portion 63 and the subcode portion 64 are laid out in this order with respect to the direction of recording and reproduction.

Figure 20:
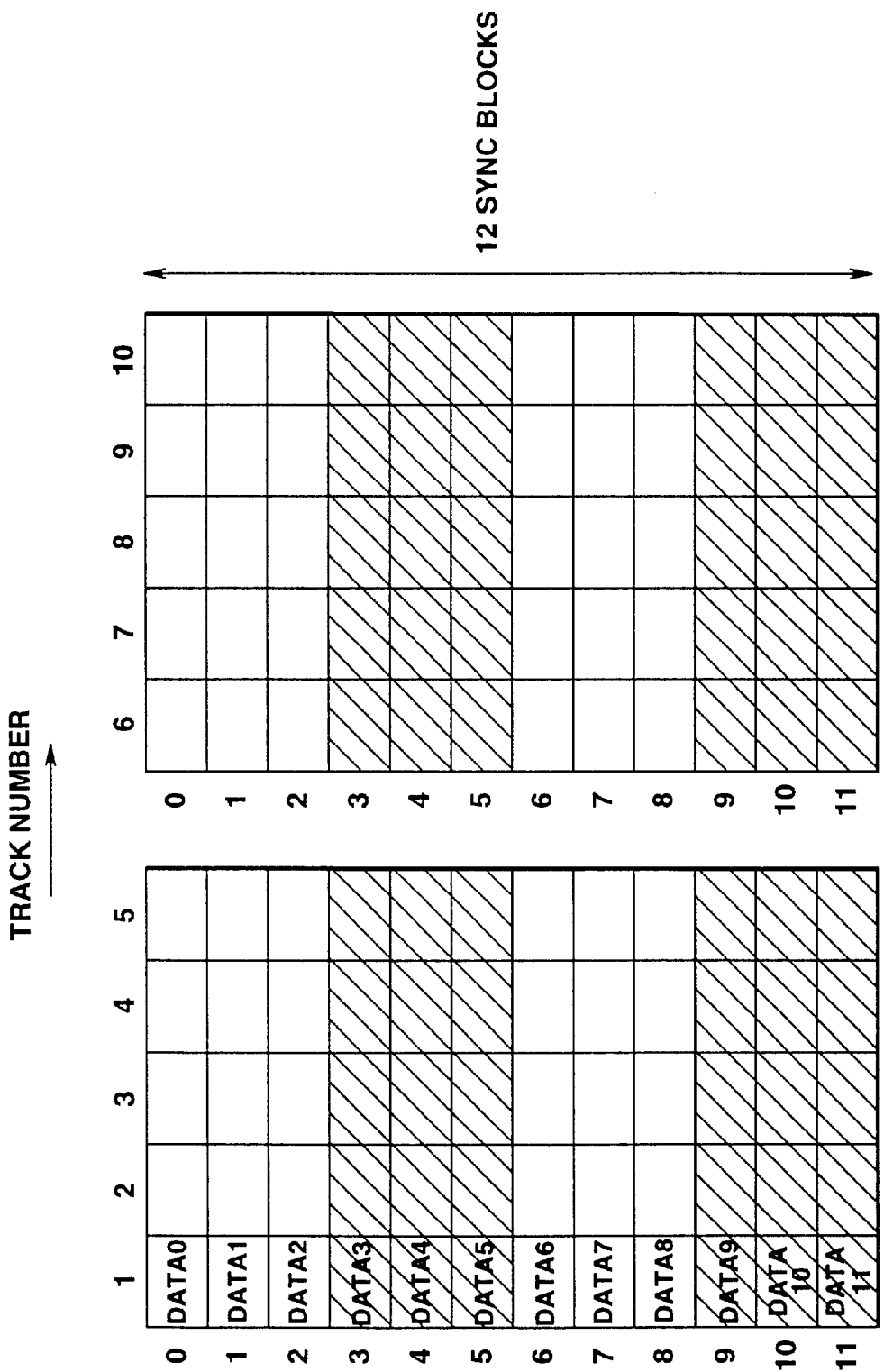
FIG. 20 is a view showing the structure of the subcode portion constituted by a block on a track of the video tape.

FIG. 20 specifically shows the subcode portion 64 on the track 61 shown in FIG. 15. FIG. 20 shows the physical layout of the subcode portion. In FIG. 20, a blank portion having no slant line indicates a portion opened to the user. The numbers shown in the lateral direction represent track numbers on the track. FIG. 20 as a whole shows the subcode portion 64 recorded in one frame. Each block is divided into 12 sync blocks as indicated by the numbers in FIG. 20, and the data structure of one sync block is shown in FIG. 21.

Figures 21, 22:
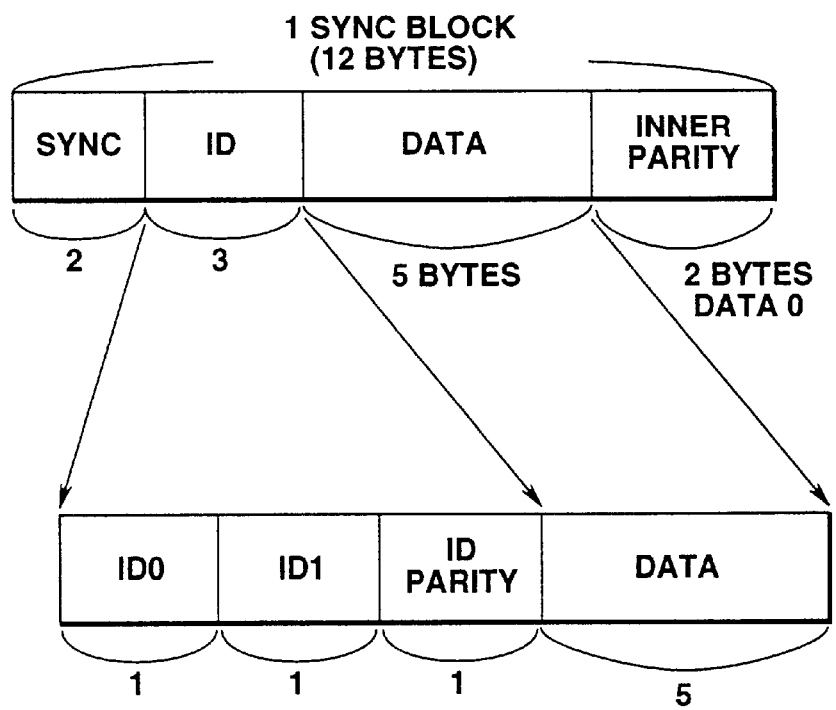
FIG. 21 is an explanatory view showing the physical layout and format of the subcode data.
FIG. 22 is a view showing the data structure of an ID portion or the like of the block constituting the subcode.

As shown in FIG. 21, one sync block consists of 12 bytes, and is divided into a sync code area of two bytes, an ID area of three bytes, a data area of five bytes and an inner parity area of two bytes. A code of each sync block is inserted in the sync code area, and subcode data is inserted in the data area. Data including the absolute track number is inserted in the ID area, and an inner parity for each block is inserted in the inner parity area.

FIG. 22 shows the structure of the ID area and the data area. The ID area of three bytes is divided into ID areas ID0, ID1 of one byte each and an ID parity area of one byte.

FIGS. 23 and 24 show details of actual data to be inserted in the ID areas ID0, ID1 and the data area. FIG. 23 shows details of data to be recorded in the subcode portion 64 of the former five tracks, and FIG. 24 shows details of data to be recorded in the subcode portion 64 of the latter five tracks. It is to be noted that the ID parity area of one byte inserted in the ID area as shown in FIG. 21 is deleted. Therefore, FIGS. 23 and 24 show the data structure of each track of FIG. 20, with the ID parity area of FIG. 21 deleted.

In FIG. 23, data laid out in the area of four bits on the MSB side of ID0×(longitudinal) 12 sync blocks and in the area of four bits on the LSB side of ID1×(longitudinal) 12 sync blocks are predetermined data, and will not be described in detail. With respect to right four bits of ID0 and left four bits of ID1, the same absolute value number of each track is recorded continuously for four blocks, every three sync blocks. In the subcode area, the above-described packs $IP_{n1}$, $IP_{n2}$, CUEn, $IP_{add1}$, and $IP_{add2}$ are recorded in the blocks corresponding to the blank areas of FIG. 20. in FIG. 23, these are indicated as $FB(IP_{n1})$, $FB(IP_{n2})$, FB(CUEn), $FB(IP_{add1})$, and $FB(IP_{add2})$. In the subcode area other than these areas, predetermined data is inserted as indicated by slant lines in FIG. 20. This data structure will not be described further in detail here.

In FIG. 24, similar to FIG. 23, data laid out in the area of four bits on the MSB side of ID0×(longitudinal) 12 sync blocks and in the area of four bits on the LSB side of ID1×(longitudinal) 12 sync blocks are predetermined data, and will not be described in detail. Also, the absolute track number is recorded in the area similar to that of FIG. 23. The absolute track number is recorded in the blank area of FIG. 20 in the subcode area. In the blank area of FIG. 20 in the subcode area, the management pack PM and reel number packs R1, R2 are recorded. In FIG. 24, these are indicated as FO(PM), $FO(R_1)$ and $FO(R_2)$.

Preparation of Index Picture Information

Referring to FIGS. 25 to 28, operation related to preparation of index picture information in the system shown in FIG. 1 will now be described.

First, operation in the case where the mark-in point, the mark-out point, OK/NG and the take number are indicated by using the operating section 33 in recording video information onto the video tape 27 by the digital VTR section 20 shown in FIG. 2 will be described. In recording video information onto the video tape 27 by the digital VTR section 20 shown in FIG. 2, a video signal from the digital video camera section is inputted to the digital VTR section 20 via the input terminal 21. This video signal is A/D converted by the A/D converter 22, and then compression-coded by the video signal compression-coding/decoding section 23. An error correction code is appended to the compression-coded signal by the error correction processing section 24, and coding processing suitable for recording onto the video tape is carried out by the channel coding section 25. Then, the processed signal is recorded onto the video tape 27 by the video head 26.

At the time of such recording, as the user selects the mark mode and indicates the mark-in point, the mark-out point, OK/NG and the take number by using the operating section 33, the indicated information and information of the scene number which automatically makes increment are recorded into the option area 54 of the cassette-appendant memory 16 and the subcode portion 64 of the video tape 27 in the digital video cassette 12 by the controller 35. Recording into the option area 54 of the cassette-appendant memory 16 is carried out as the controller 35 transmits the data to the cassette-appendant memory 16 via the terminals 34, 15. Recording into the subcode portion 64 of the video tape 27 is carried out as the controller 35 transmits the data to the channel coding section 25. The information of the mark-in point, the mark-out point, OK/NG, the take number and the scene number is recorded by the packs $IP_{n1}$, $IP_{n2}$ shown in FIGS. 7 and 8. When the cue mode is selected, the shooting start time and the shooting end time of each scene are automatically employed as the mark-in point and the mark-out point, respectively, and this information is recorded onto the cassette-appendant memory 16 and the video tape 27. If the cue point is indicated by the operating section 33, the information is recorded into the option area 54 of the cassette-appendant memory 16 and the video tape 27 by the pack CUEn shown in FIG. 9. In addition, an index picture at the point indicated by the above-described operation of the operating section 33 is controlled by the controller 35 and recorded at a predetermined position on the tape. (In this case, a simplified index picture is stored in the internal memory 102b, and on completion of shooting, the simplified index picture stored in the internal memory 102b is outputted.)

Figure 25:
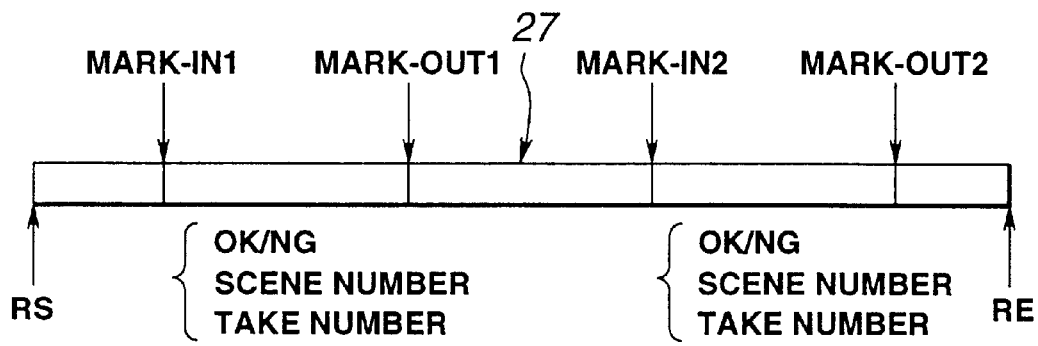
FIG. 25 is a view showing the state of the video tape in the case where a pair of mark-in point and mark-out point is designated at two positions at the time recording video information.

FIG. 25 schematically shows the state of the video tape 27 in the case where a pair of mark-in point and mark-out point is designated at two positions at the time of recording video information as described above. In FIG. 25, RS represents a recording start point, RE represents a recording end point, MARK-IN1 represents a first mark-in point, MARK-OUT1 represents a first mark-out point, MARK-IN2 represents a second mark-in point, and MARK-OUT2 represents a second mark-out point. Additional information of OK/NG, the take number and the scene number is appended to a first recording material between the first mark-in point and the first mark-out point and to a second recording material between the second mark-in point and the second mark-out point.

In the above description, the mark-in point and the like are indicated at the time of recording video information. In this embodiment, however, the mark-in point and the like may be indicated by using the operating section 33 when video information recorded on the video tape 27 is reproduced by the digital VTR section 20 or the digital video cassette recorder 13 shown in FIG. 3. In this case, in indicating the mark-in point and the like, the user may operate the operating section 33 after temporarily stopping reproduction at a target scene, or may operate the operating section 33 at a target scene while continuing reproduction. The method for recording the additional information of the mark-in point and the like indicated at the time of reproducing video information onto the cassette-appendant memory 16 and the video tape 27 is similar to the method used at the time of recording video information. In reproducing the video information, the video information is decoded by the channel coding section 25, and error correction is carried out by the error correction processing section 24. Then, the video information is decoded by the video signal compression-coding/decoding section 23, D/A converted by the D/A converter 28, and outputted from the output terminal 29.

Next, operation to prepare index picture information and record the index picture information onto the video tape 27 by using the digital video cassette 12 in which video information is recorded onto the video tape 27 as described above while additional information such as the mark-in point is recorded on the cassette-appendant memory 16 and the video tape 27 will be described with reference to FIG. 26.

Figure 26:
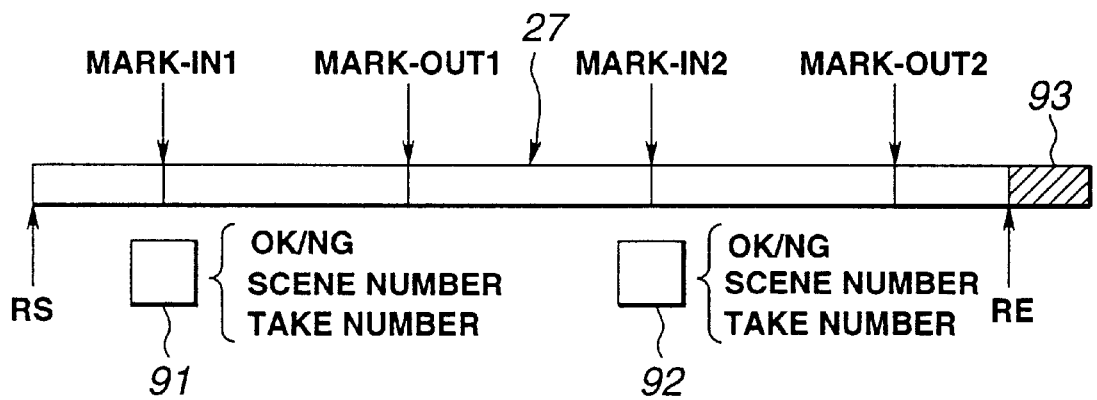
FIG. 26 is a view showing the state of the video tape in preparing index picture information.

FIG. 26 schematically shows the state of the video tape 27 in preparing index picture information. Preparation of index picture information is carried out by the digital video cassette recorder 13 shown in FIG. 3. When the user indicates preparation of index picture information by using the operating section 33, the controller 35 of the digital video cassette recorder 13 reads the information of all mark-in points, that is, the time code, from the cassette-appendant memory 16, and controls the mechanism section 31 to pre-roll the video tape 27 to a pre-roll point with respect to the first mark-in point. Then, the controller 35 reproduces a picture at the first mark-in point, that is, an index picture 91. The controller 35 performs control to transmit the index picture to the channel coding section 25 and the error correction processing section 24 via the video signal compression-coding/decoding section 23, then transmit the decoded index picture 91 to the index preparation section 40, and store the index picture 91 in the index memory 41. With respect to the second mark-in point, the controller 35 similarly performs control to pre-roll the video tape 27 to a pre-roll point, reproduce a picture at the mark-in point, that is, an index picture 92, transmit the index picture 92 decoded via the channel coding section 25, the error correction processing section 24 and the video signal compression-coding/decoding section 23 to the index preparation section 40, and store the index picture 92 in the index memory 41. Similar operation is carried out with respect to the third and subsequent mark-in points.

The index preparation section 40 transmits the index picture, taken therein, to the video signal compression-coding/decoding section 23 for compression and reduction. The video signal compression-coding/decoding section 23 carries out DCT processing on the block basis of a predetermined size with respect to the transmitted signal, and transmits a DC (direct current) component of each block to the index preparation section 40. The index preparation section 40 prepares a compressed and reduced index picture by using the DC component of each block, and stores the compressed and reduced index picture data at a position of a predetermined address in the index memory 41, thus preparing index picture information as aggregate screen picture information of compressed and reduced index pictures (that is, simplified index pictures). When the index preparation section 40 stores a predetermined volume of the compressed and reduced index picture data, allocated for index picture information, into the index memory 41, the controller 35 switches the switch 39 to output the index picture information from the index preparation section 40 and input the index picture information to the video signal compression-coding/decoding section 23 via the switch 39. At the same time, the controller 35 controls the mechanism section 31 to enable recording of the signal at a predetermined position (for example, after the recording end point RE or after the recording start point RS) on the video tape 27. The index picture information outputted from the index preparation section 40 is compression-coded by the video signal compression-coding/decoding section 23, then processed with predetermined processing by the error correction processing section 24 and the channel coding section 25, and recorded at the predetermined position on the video tape 27 by the video head 26.

Figure 27:
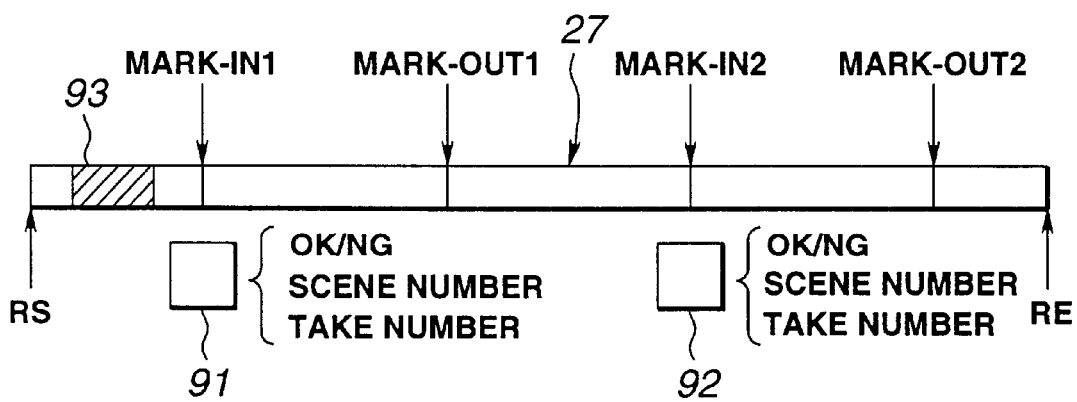
FIG. 27 is a view showing the state of the video tape on which, after index picture is prepared, the index picture information is recorded subsequently to a recording start point.

FIG. 26 shows an example in which index picture information 93 is recorded continuously after the recording end point RE. FIG. 27 shows an example in which after index picture information is prepared similarly to the example of FIG. 26, the index picture information 93 is recorded continuously after the recording start point RS. After the recording start point RS, a black signal is originally recorded for several seconds. Therefore, even when the index picture 93 is recorded at this position, the video information is not damaged or lost.

When the index picture 93 has been recorded on the video tape 27, the controller 35 records the time code at the recording position of the index picture information 93 on the video tape 27 into the option area 54 of the cassette-appendant memory 16 and into the subcode portion 64 at the predetermined position on the video tape 27 (for example, the same position as the recording position of the index picture information 93 or a position in the vicinity thereof), by using the packs $IP_{add1}$, $IP_{add2}$.

Figure 28:
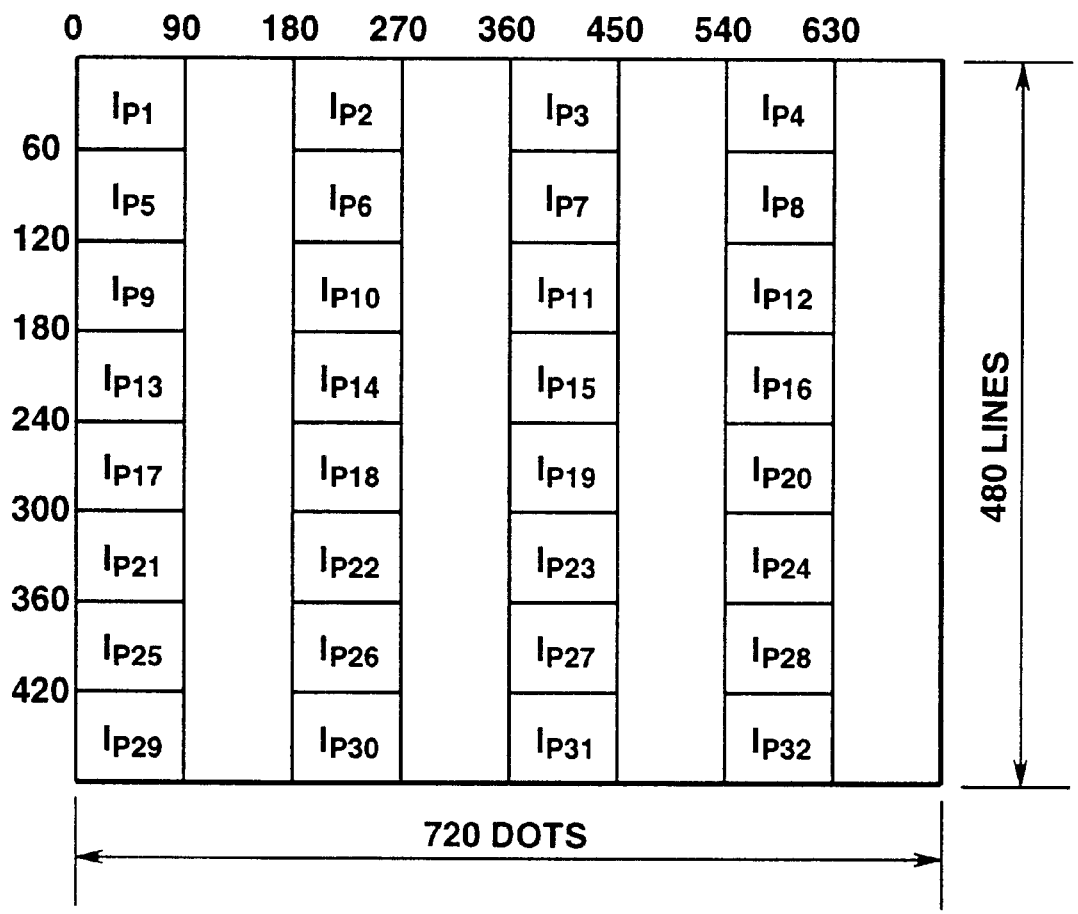
FIG. 28 is a view for explaining an example of a picture displayed by the index picture information.

FIG. 28 is a view for explaining an example of a picture displayed by the index picture information. This example is in conformity to the NTSC format, in which 32 simplified index picture at the maximum are laid out in one frame consisting of 720 dots 480 lines. In FIG. 28, portions indicated by numerals 1 to 32 represent simplified index pictures, and the simplified index pictures are recorded in the order of the numerals 1 to 32 in accordance with a temporal order (from the smallest time code).

In the above description, the picture at each mark-in point is unconditionally used as an index picture. In this embodiment, however, a picture matching a desired condition may be selected as an index picture from the pictures at the respective mark-in points on the basis of the information of OK/NG, the take number and the scene number as additional information.

The example shown in FIG. 26 is not the case where the index picture is selected by designating the scene number. However, it may be realized similarly to the case where the index picture is selected by designating the take number.

Also, in the above description, the picture at each mark-in point is used as an index picture. However, a picture at each cue point may be used as an index picture. In this case, index pictures are prepared with respect to pictures at all cue points on the basis of the time code of the pack CUEn recorded in the option area 54 of the cassette-appendant memory 16, and are recorded at a predetermined position on the video tape 27.

Referring to FIGS. 29 to 33, the structure and operation of the editing device 14 will be now be described.

Structure of Editing Device 14

Figure 29:
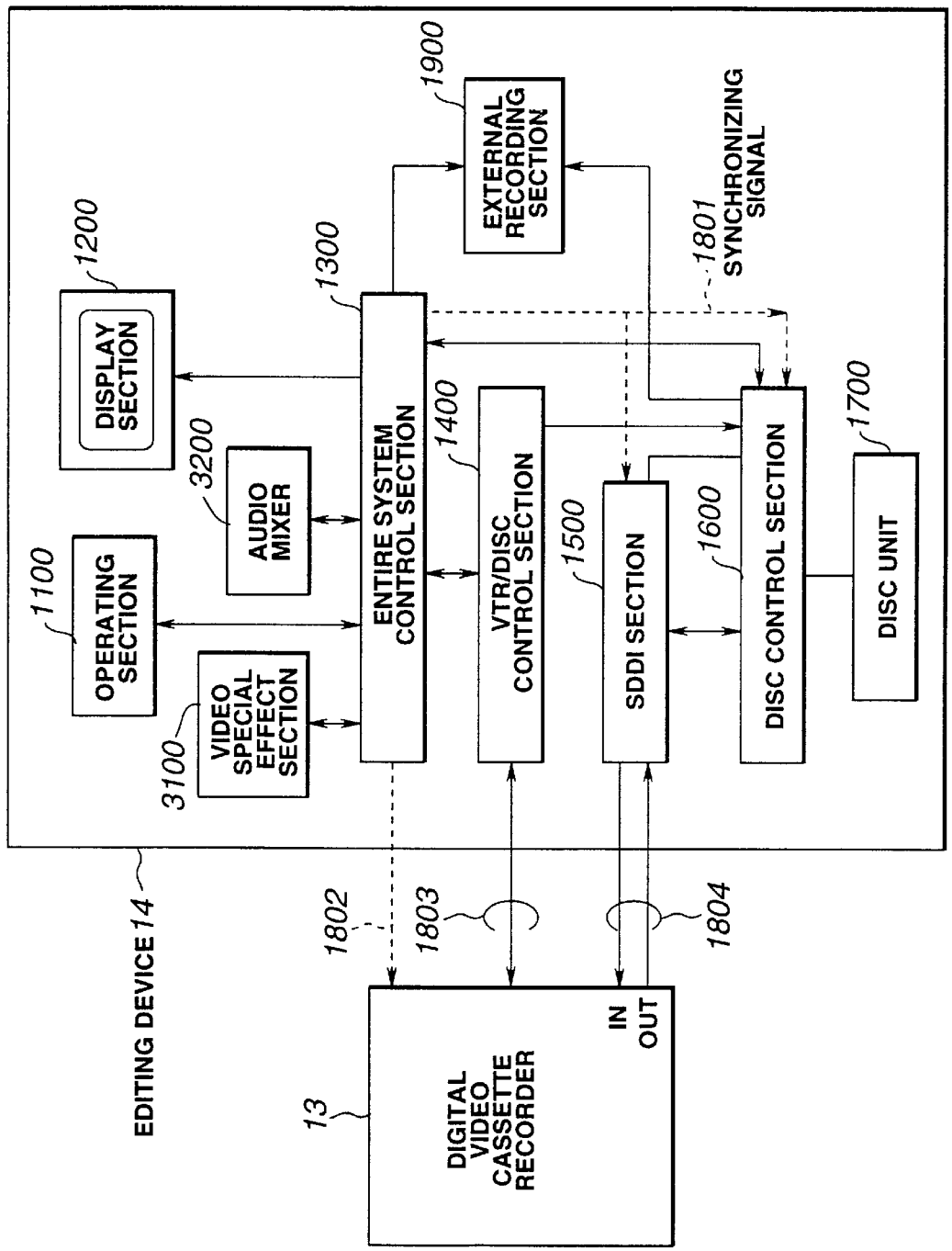
FIG. 29 is a block circuit diagram showing an editing device of the editing system.

Referring to FIGS. 29 to 33, the structure of the editing device 14 will be first described. FIG. 29 shows the schematic structure of the editing device 14 of FIG. 1 and the connection between the editing device 14 and the digital video cassette recorder 13. As shown in FIG. 29, the editing device 14 includes an operating section 1100 including a mouse and a keyboard, a display section 1200 including a CRT display unit or the like, an entire system control section 1300 connected with the operating section 1100 and the display section 1200, a VTR/Disc control section 1400 connected with the entire system control section 1300, a serial digital data interface (SDDI I/F) 1500, a disc control section 1600 connected with the entire system control section 1300, the VTR/Disc control section 1400 and the SDDI section 1500, and a disc unit 1700 connected with the disc control section 1600.

The editing device 14 further includes a video special effect section 3100 connected with the entire system control section 1300 and adapted for implementing special effects of video materials, an audio mixer 3200 connected with the entire system control section 1300 and adapted for carrying out audio special mixing processing, and an external recording section 1900 connected with the entire system control section 1300.

The operating section 1100 is operated in carrying out recording, reproduction and editing works with respect to the digital video cassette 12 set in the digital video cassette recorder 13. The display section 1200 is adapted for displaying necessary screens for carrying out such works. Various commands supplied from the operating section 1100 are transmitted via the entire system control section 1300 to the VTR/Disc control section 1400, where these commands are converted to the format in conformity to the signal format on a signal cable 1803. The converted commands are transmitted to the digital video cassette recorder 13 so as to control this digital video cassette recorder 13. The entire system control section 1300 supplies a synchronizing signal 1801 to the VTR/Disc control section 1400, the SDDI section 1500 and the disc control section 1600 so as to carry out synchronous control of the editing device 14, and supplies a synchronizing signal 1802 to the digital video cassette recorder 13. The VTR/Disc control section 1400 transmits/receives a control command, the above-described IP-related information (mark-in point, cue point, OK/NG and the like), and tape management information (reel number and the like) to/from the digital video cassette recorder 13 via the control signal cable 1803, and controls the disc control section 1600.

The SDDI section 1500 functions as a data interface between the digital video cassette recorder 13 and the disc control section 1600. The SDDI section 1500 has a function to convert the signal format of data (video data, audio data and subcode) transmitted on an SDDI cable 1804 from the digital video cassette recorder 13 and transmit the converted data to the disc control section 1600. At the same time, the SDDI section 1500 has a function to convert the signal format of data from the disc control section 1600 and transmit the converted data to the digital video cassette recorder 13 through the SDDI cable 1804. The video data include index picture information as well as video materials. The video materials are video data and audio data obtained at the time of shooting for report or for production of a drama. The disc control section 1600 controls the operation of the disc unit 1700 and also controls recording/reproduction of data with respect to the disc unit 1700.

The external recording section 1900 records editing data in carrying out various editing processing onto the external recording medium 2000 of FIG. 1, under the control of the entire system control section 1300.

Figure 30:
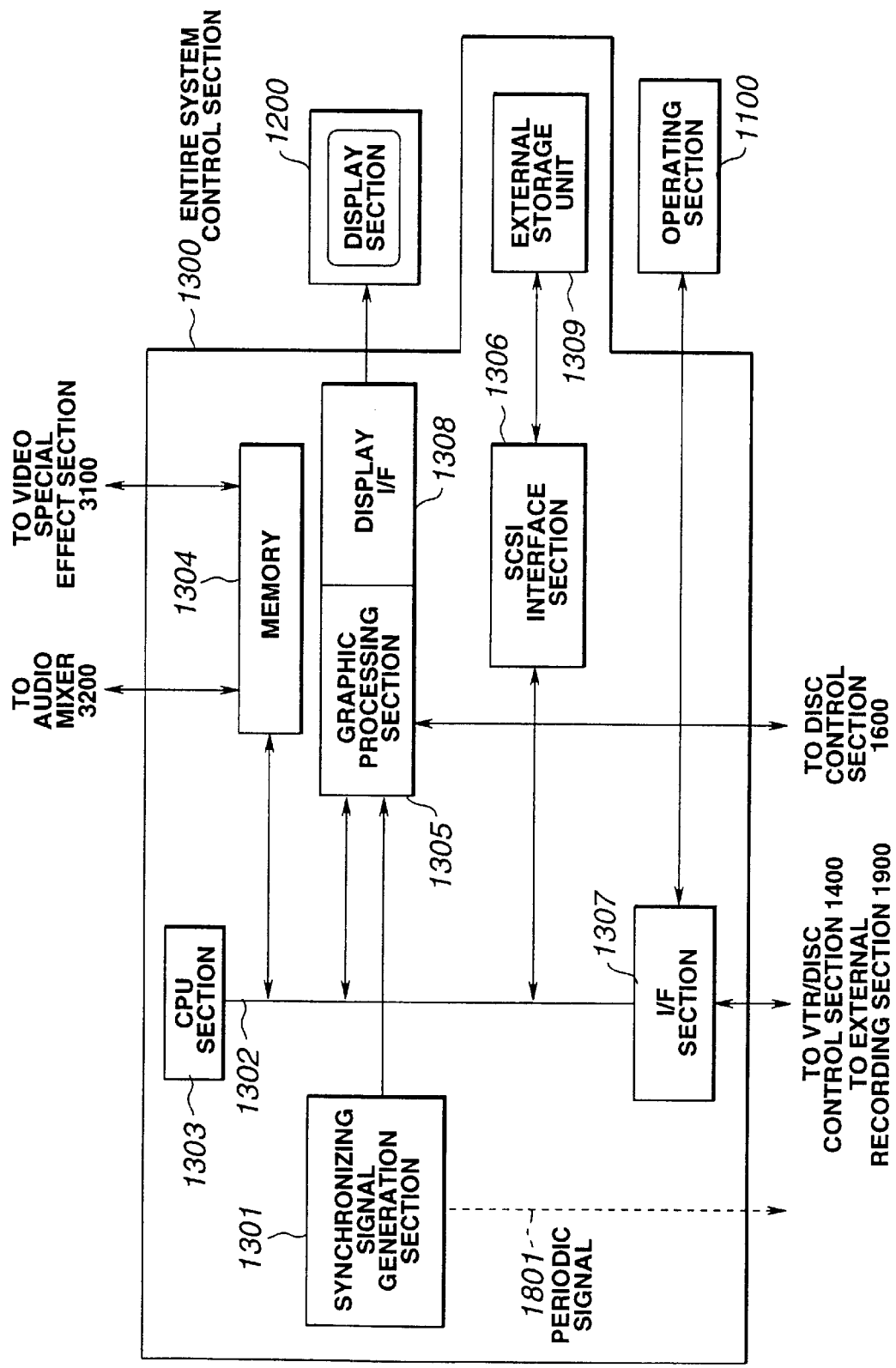
FIG. 30 is a block circuit diagram showing an entire system control section of the editing device.

FIG. 30 shows the structure of the entire system control section 1300. As shown in FIG. 30, the entire system control section 1300 includes a synchronizing signal generation section 1301 for generating the synchronizing signal 1801, a CPU section 1303, a memory 1304, a graphic processing section 1305, a SCSI (Small Computer System Interface) interface section 1306 and an interface (I/F) section 1307 which are interconnected by an internal bus 1302, a display I/F 1308 connected with the graphic processing section 1305, and an external storage unit 1309 connected with the SCSI interface section 1306.

The memory 1304 functions as a work memory in carrying out editing work using index pictures, as later described. That is, the work memory 1304 is connected with the video special effect section 3100 and the audio mixer 3200 so as to carry out actual various special effects of images and mixing of sounds.

The SCSI interface section 1306 carries out data format conversion with respect to the external storage unit 1309, and the display I/F 1308 carries out data format conversion with respect to the display section 1200. The I/F section 1307 carries out interface with respect to the operating section 1100, the VTR/Disc control section 1400 and the external recording section 1900. The external storage unit 1309 is adapted for storing the data (FIG. 9) read from the cassette-appendant memory 16 of the digital video cassette 12 set in the digital video cassette recorder 13 and the index picture information (FIG. 28) read out from the disc unit 1700 and transmitted via the disc control section 1600. The graphic processing section 1305 is connected with the disc control section 1600 and adapted for transmitting/receiving the index picture information. The information expressing individual simplified index pictures displayed on the display section 1200 is converted to the format to be recorded onto the video tape 27 by the graphic processing section 1305, and outputted on the frame basis as information of an aggregate screen of the simplified index pictures (that is, the index picture information). The index picture information is transferred to the disc unit 1700 via the disc control section 1600.

Figure 31:
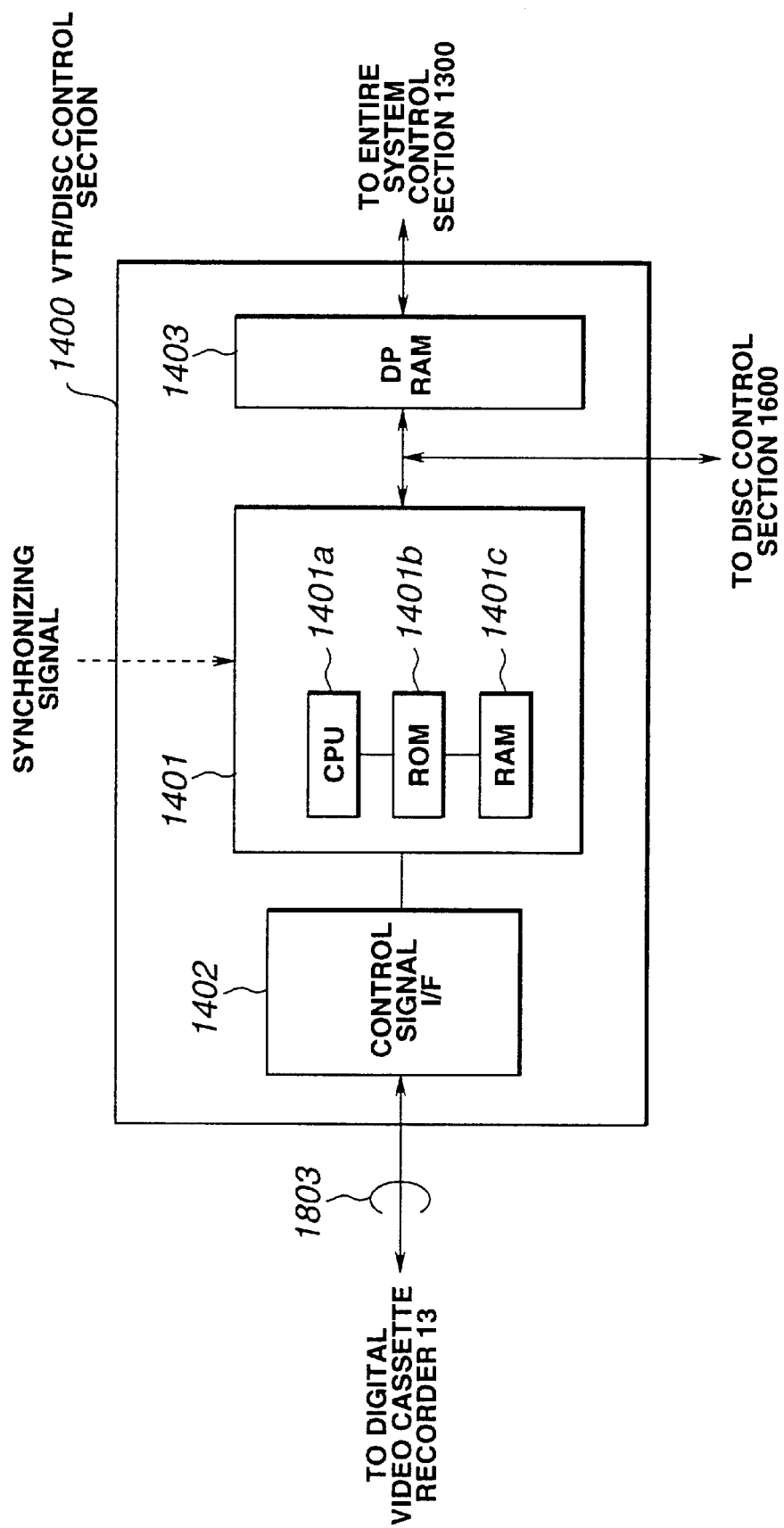
FIG. 31 is a block circuit diagram showing a VTR/DISC control section of the editing device.

FIG. 31 shows the schematic structure of the VTR/Disc control section 1400. As shown in FIG. 31, the VTR/Disc control section 1400 includes a main CPU section 1401 including a CPU 1401a, a ROM 1401b, a RAM 1401c, and a DPRAM (dual port random access memory) I/F, not shown. The VTR/Disc control section 1400 also includes a control signal I/F 1402 and a DPRAM 1403. The control signal I/F 1402 is connected with the digital video cassette recorder 13 by the signal cable 1803 (FIG. 29), and DPRAM 1403 is connected with the entire system control section 1300. The main CPU section 1401 is also connected with the disc control section 1600.

In the VTR/Disc control section 1400 of such structure, when various commands and status are inputted from the entire system control section 1300, these commands and status are transmitted to the main CPU 1401 via the DPRAM 1403, and then converted to the format to be transmitted on the signal cable 1803 by the control signal I/F 1402. The converted commands and status are transmitted to the digital video cassette recorder 13 through the signal cable 1803, synchronously with the synchronizing signal 1802. Also, the main CPU 1401 has a function to carry out format conversion on receiving a command from the entire system control section 1300 and transmit the converted command to the disc control section 1600. On receiving a recording command or an assemble command from the entire system control section 1300, the main CPU section 1401 controls the digital video cassette recorder 13 to record the command onto the video tape 27 from the current position with the format shown in FIGS. 23 and 24.

Figure 32:
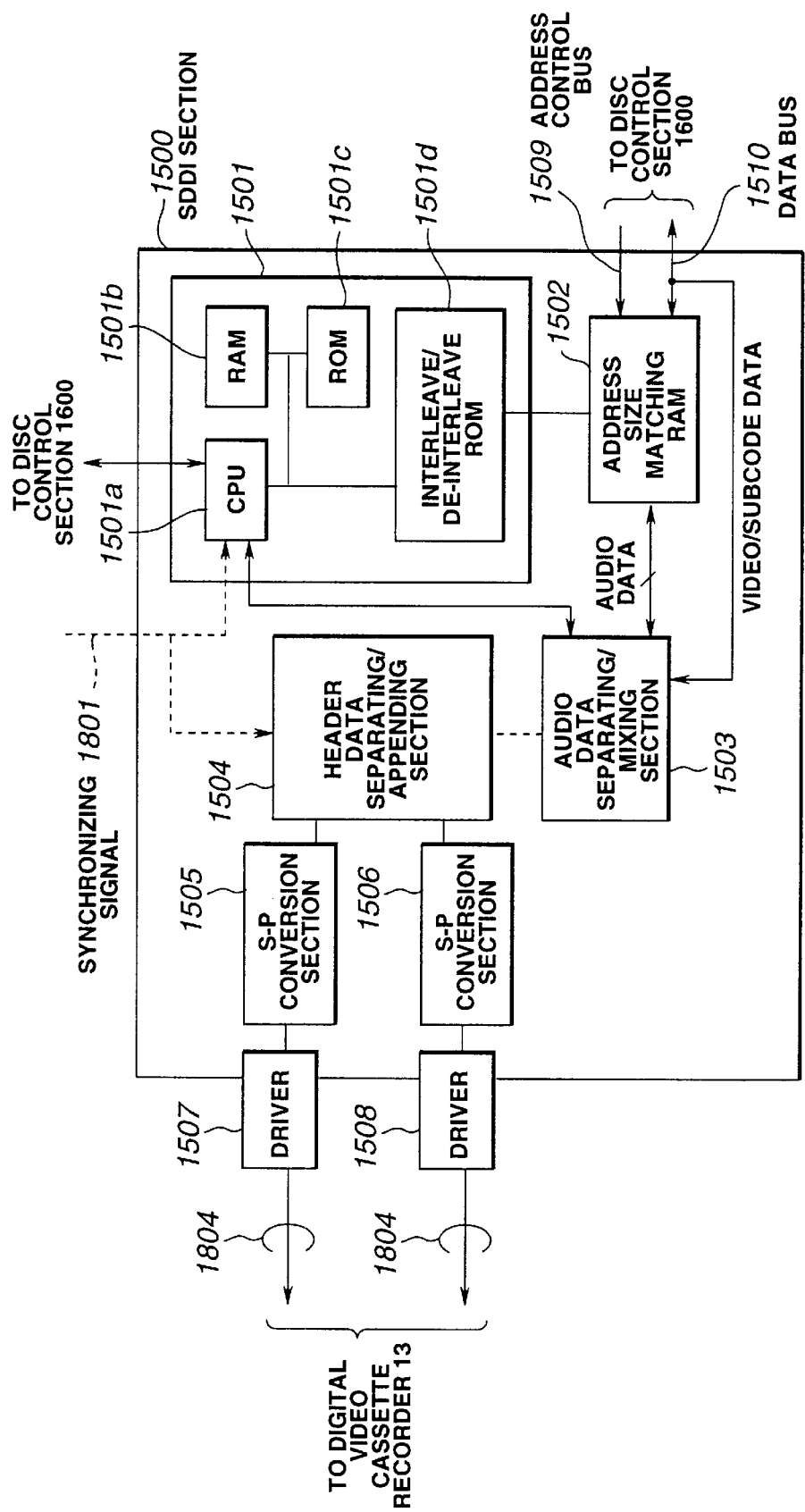
FIG. 32 is a block circuit diagram showing an SDDI section of the editing device.

FIG. 32 shows the structure of the SDDI section 1500. As shown in FIG. 32, the SDDI section 1500 includes a CPU section 1501 including a CPU 1501*a*, a RAM 1501*b*, a ROM 1501*c*, and a interleave/de-interleave ROM 1501*d*. The SDDI section 1500 also includes an address size matching RAM 1502 connected with the CPU section 1501, an audio data separating/mixing section 1503 connected with the CPU section 1501 and the address size matching RAM 1502, a header data separating/appending section 1504 connected with the audio data separating/mixing section 1503, serial-parallel (S-P) conversion sections 1505 and 1506 connected with the header data separating/appending section 1504, a driver 1507 connected with the S-P conversion section 1505, and a receiver 1508 connected with the S-P conversion section 1506.

The CPU section 1501 and the header data separating/appending section 1504 are supplied with the synchronizing signal 1801 so as to carry out synchronous operation. The CPU section 1501 is connected with the disc control section 1600. The driver 1507 and the receiver 1508 are connected with an input terminal IN and an output terminal OUT of the digital video cassette recorder 13, respectively, by the SDDI cable 1804. The address size matching RAM 1502 is connected with the disc control section 1600 by an address control bus 1509 and a data bus 1510.

In the SDDI section 1500, SDDI data (video data, audio data and subcode), reproduced by the digital video cassette recorder 13 and serially transferred from the output terminal OUT thereof on the SDDI cable 1804, are received by the receiver 1508, then converted to parallel data by the S-P conversion section 1506, and inputted to the header data separating/appending section 1504. In the header data separating/appending section 1504, a header portion and a data portion are separated. In the audio data separating/mixing section 1503, audio data is extracted from the data portion, and the audio data inserted in the data portion is separated from the video data and the subcode. The CPU 1501*a* carries out de-interleave processing on the extracted audio data with reference to the interleave/de-interleave ROM 1501*d*, and writes the processed audio data into the address size matching RAM 1502. The audio data written in the address size matching RAM 1502 is transferred to the disc control section 1600 through the address control bus 1509 and the data bus 1510.

The video data and the subcode separated by the audio data separating/mixing section are transferred to the disc control section 1600 from the data bus 1510, without passing through the address size matching RAM 1502.

On the other hand, data from the disc control section 1600 is temporarily written in the address size matching RAM 1502. The CPU 1501*a* measures a necessary data quantity during a period measured by the synchronizing signal (frame pulse), then makes a predetermined amount of interleave continuously from the previous frame, and transmits the audio data to the audio data separating/mixing section 1503.

Also, the video data and the subcode data are transferred directly to the audio data separating/mixing section 1503 from the data bus 1510, without passing through the address size matching RAM 1502.

The audio data separating/mixing section 1503 mixes the audio data with the video data, and the header data separating/appending section 1504 appends a header portion to the data. The data having the header portion appended thereto is converted to serial data by the S-P conversion section 1505 and transmitted as SDDI data (video data, audio data and subcode) from the driver 1507. The SDDI data is serially transferred on the SDDI cable 1804 and inputted to the input terminal IN of the digital video cassette recorder 13.

Figure 33:
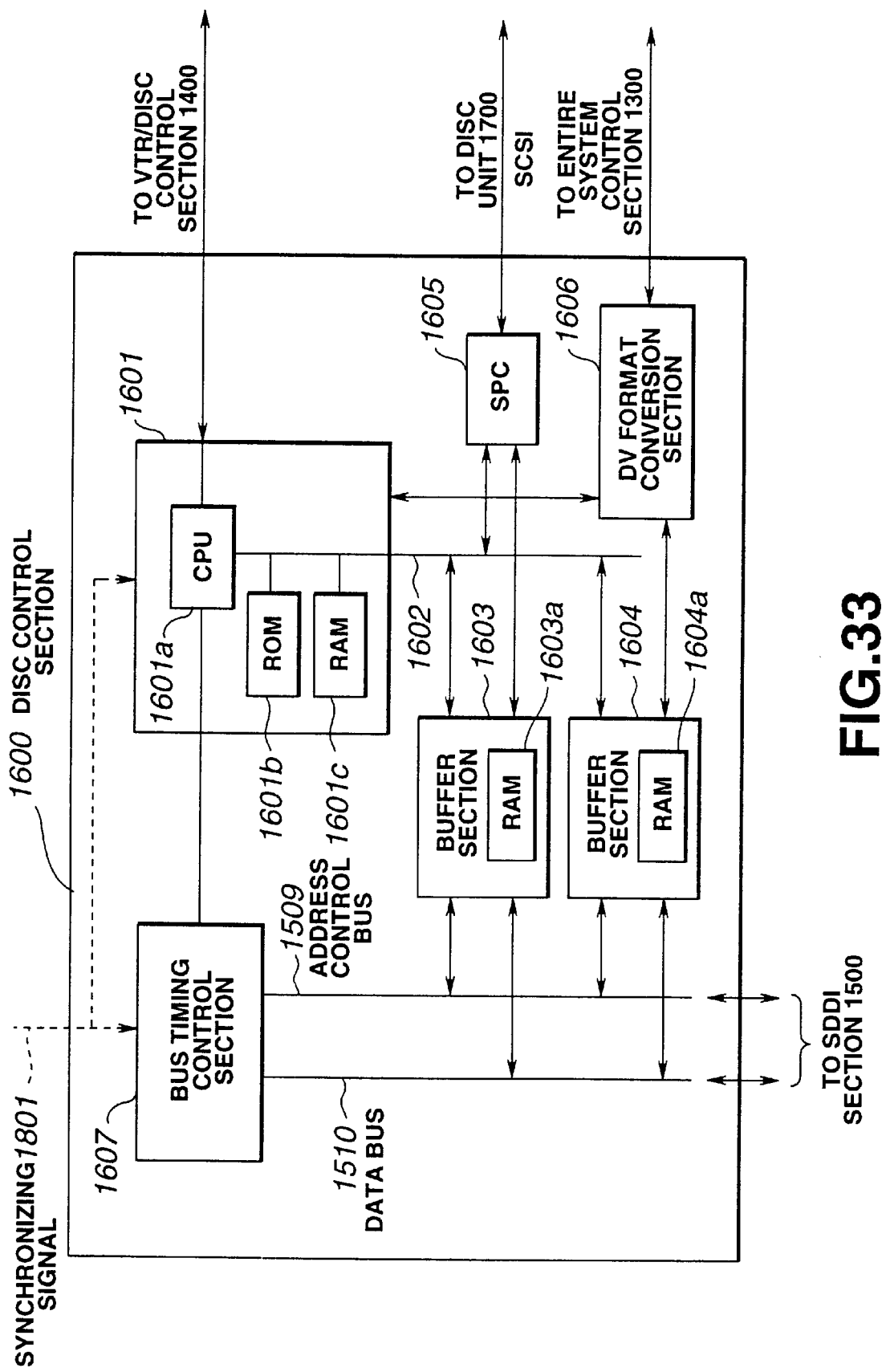
FIG. 33 is a block circuit diagram showing a disc control section of the editing device.
Figure 34:
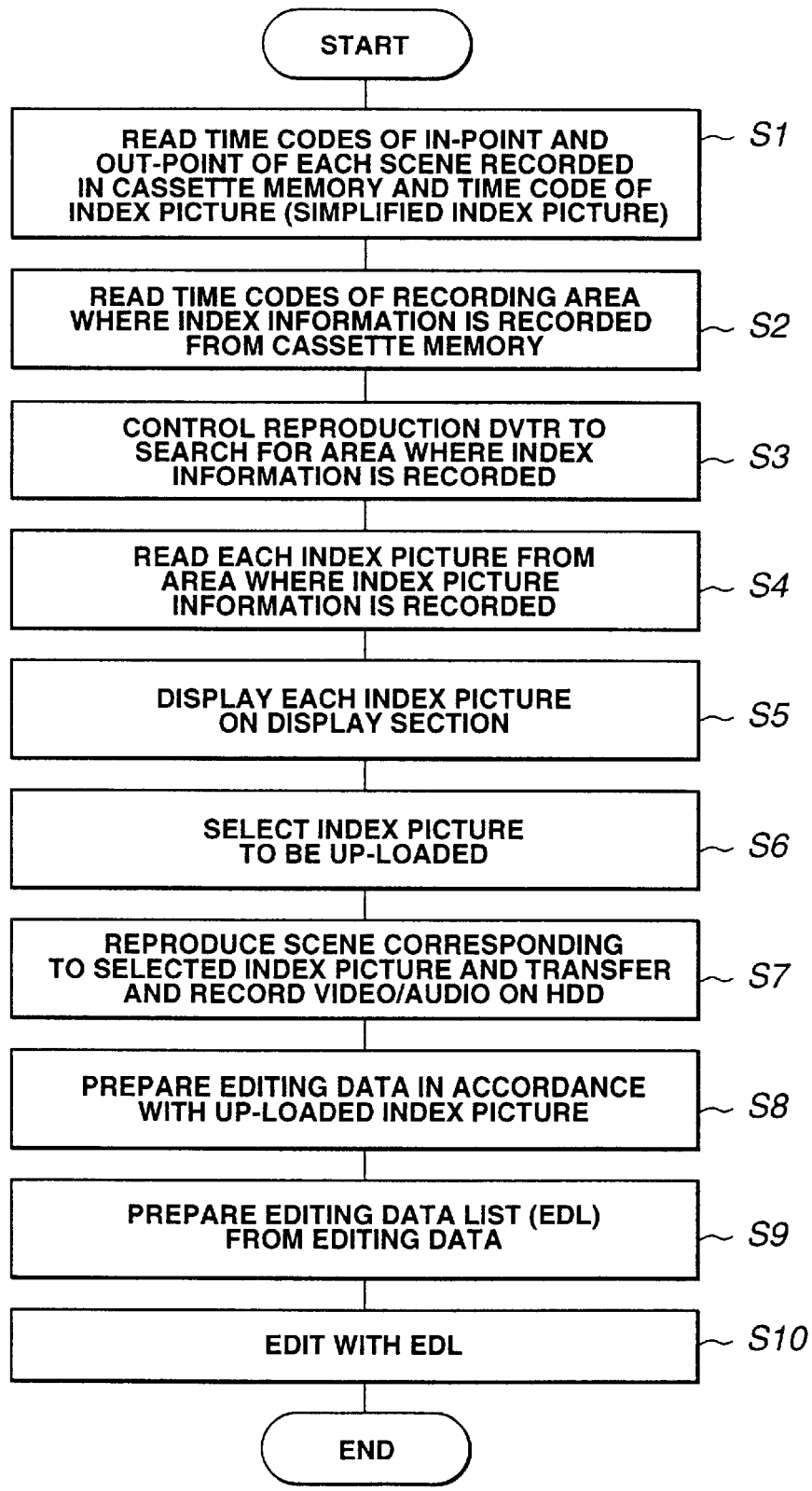
FIG. 34 is a flowchart showing an example of the operation of the editing device.

FIG. 33 shows the structure of the disc control section 1600. As shown in FIG. 33, the disc control section 1600 includes a CPU section 1601 including a CPU 1601*a*, a ROM 1601*b* and a RAM 1601*c*, buffer sections 1603, 1604 and a SCSI protocol controller (SPC) 1605 connected to the CPU section 1601 through an internal control bus 1602, a DV (digital video) format conversion section 1606 connected to the CPU section 1601 through a control line, and a bus timing control section 1607 connected to the CPU 1601*a*, the address control bus 1509 and the data bus 1510. The SPC 1605 is connected to the disc unit 1700 through a SCSI bus. The buffer section 1603 and the SPC 1605 are directly connected by a data line, and the buffer section 1604 and the DV format conversion section 1606 are directly connected by a data line. The buffer section 1603 includes a RAM 1603*a*, and is connected to the address control bus 1509 and the data bus 1510. The buffer section 1604 includes a RAM 1604*a*, and is connected to the address control bus 1509 and the data bus 1510. The address control bus 1509 and the data bus 1510 are connected to the SDDI section 1500, as explained with reference to FIG. 32. The CPU section 1601 and the bus timing control section 1607 are supplied with the synchronizing signal 1801 so that these sections carry out synchronous operation.

The operation of the disc control section 1600 of such structure will now be briefly described. This disc control section 1600 basically carries out processing to write video data and the like read out from the digital video cassette recorder 13 and transferred through the SDDI section 1500 to the disc unit 1700 (hereinafter referred to as up-load processing), and processing to transfer video data and the like read out from the disc unit 1700 to the digital video cassette recorder 13 through the SDDI section 1500 (hereinafter referred to as down-load processing). The timing for operation thereof is controlled by the bus timing control section 1607. The video data referred to in this case include index picture information.

Specifically, on receiving an up-load command from the VTR/Disc control section 1400, the CPU 1601*a* controls the bus timing control section 1607 so as to temporarily store video data and the like read out from the digital video cassette recorder 13 and transferred from the SDDI section 1500 through the data bus 1510 into the RAM 1603*a* of the buffer section 1603, and then to transfer video data and the like to the disc unit 1700 through the SPC 1605 by DMA (direct memory access) transfer. On the other hand, on receiving a down-load command from the VTR/Disc control section 1400, the CPU 1601*a* temporarily stores video data and the like read out from the disc unit 1700 into the RAM 1603*a* of the buffer section 1603 through the SPC 1605 by DMA transfer, and then transfers the video data and the like to the SDDI section 1500 through the data bus 1510. The video data and the like are further transmitted to the digital video cassette recorder 13 via the SDDI section 1500 and recorded therein.

The disc control section 1600 also has a function to carry out mutual transfer of index picture information between the disc unit 1700 and the entire system control section 1300. In this case, on receiving an IP up-load command, the CPU 1601 a temporarily stores index picture information into the RAM 1603*a* of the buffer section 1603 through the SPC 1605 by DMA transfer. This index picture information is temporarily stored in the RAM 1604*a* of the buffer section 1604 through the data bus 1510, then transmitted to the DV format conversion section 1606 by DMA transfer, and then transferred to the entire system control section 1300. On the other hand, on receiving an IP down-load command, the CPU 1601 a temporarily stores index picture information transmitted to the DV format conversion section 1606 from the entire system control section 1300 into the RAM 1604a of the buffer section 1604 by DMA transfer. This index picture information is temporarily stored in the RAM 1603a of the buffer section 1603 through the data bus 1510, then transferred to the disc unit 1700 through the SPC 1605 by DMA transfer, and the written therein.

After this up-load processing, using the operating section 1100 and the display section 1200, the editor relocates index pictures (simplified index pictures) of individual scenes recorded on the disc unit 1700 or adjusts the time so as to prepare editing data which may be referred to as a project file.

In the editing in this case, however, since video and audio signals reproduced from the digital video cassette recorder 13 are compressed signals of deteriorated picture quality, this editing is not suitable for main editing for obtaining video signals of high quality. Such editing is generally regarded as temporary editing in comparison with main editing, except for the case where deterioration in picture quality is rarely generated with a low compression ratio or the case where deterioration in picture quality is allowed to a certain extent even with a high compression ratio.

From the editing data referred to as the project file prepared by temporary editing, an editing data list EDL is prepared. On the basis of the EDL, the above-described main editing is carried out on video signals having no deterioration in picture quality.

Referring to FIGS. 34 to 46, the operation to prepare the EDL after temporary editing and carry out main editing by using the editing system of the above-described structure will now be described.

First, the data shown in FIG. 6 (including the IP-related information such as mark-in point, mark-out point, OK/NG, take number and scene number) are read out from the cassette-appendant memory 16 of the digital video cassette 12, then transferred to the editing device 14 through the signal cable 1803, then transmitted to the entire system control section 1300 through the VTR/Disc control section 1400, and temporarily written in the external storage unit 1309. The index picture information (FIG. 28) included in the video data written in the disc unit 1700 is transferred to and written in the external storage unit 1309 of the entire system control section 1300 (steps S1, S2 of FIG. 34).

When a command generated from entire system control section 1300 of the editing device 14 is sent to the digital video cassette recorder 13 through the signal cable 1803 via the VTR/Disc control section 1400, the digital video cassette 12 set in the digital video cassette recorder 13 is reproduced. Then, the video data, audio data and subcode are transferred to the editing device 14 through the SDDI cable 1804, and are written into the disc unit 1700 through the SDDI section 1500 and the disc control section 1600 (steps S3, S4).

Figure 35:
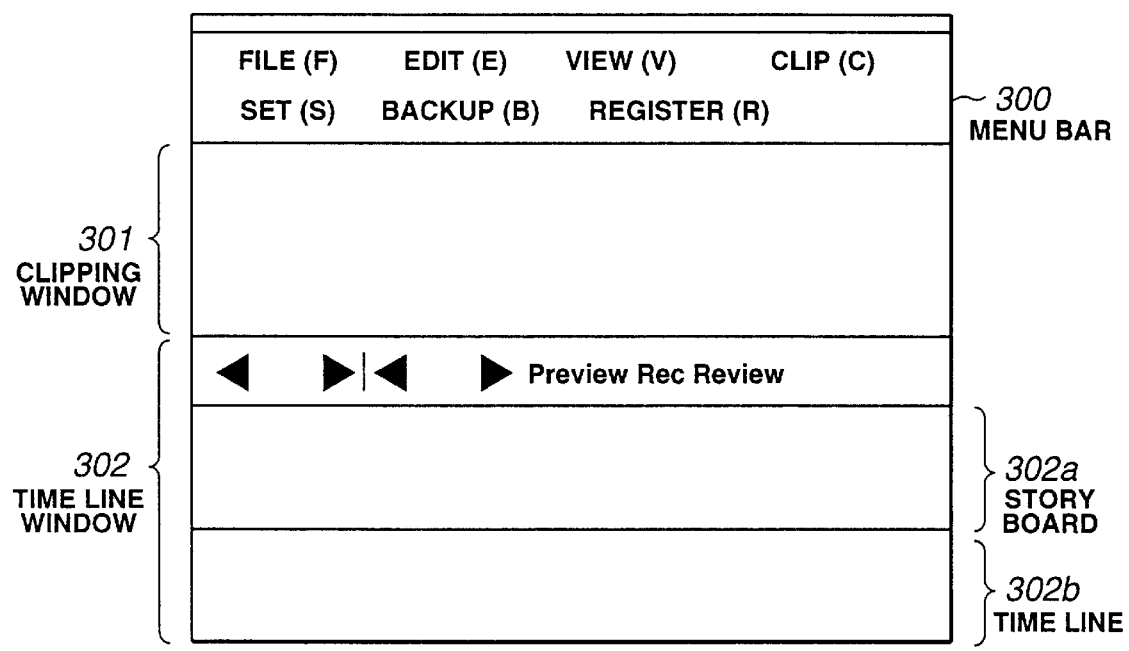
FIG. 35 is a view showing an example of an editing screen on a display section of the editing system, in the state that the contents of the digital video cassette are not read into the editing device.

FIG. 35 shows an example of an editing screen in the display section 1200 in an initial state (where the contents of the digital video cassette 12 are not written in the editing device 14). As shown in FIG. 35, the editing screen includes a menu bar 300, a clipping window 301 for temporarily arraying and displaying simplified index pictures for editing, and a time line window 302 which has a story board 302a for arraying and displaying simplified index pictures selected from the clipping window 301 in the recording order and a time line 302b for carrying out various editing works.

Figure 36A:
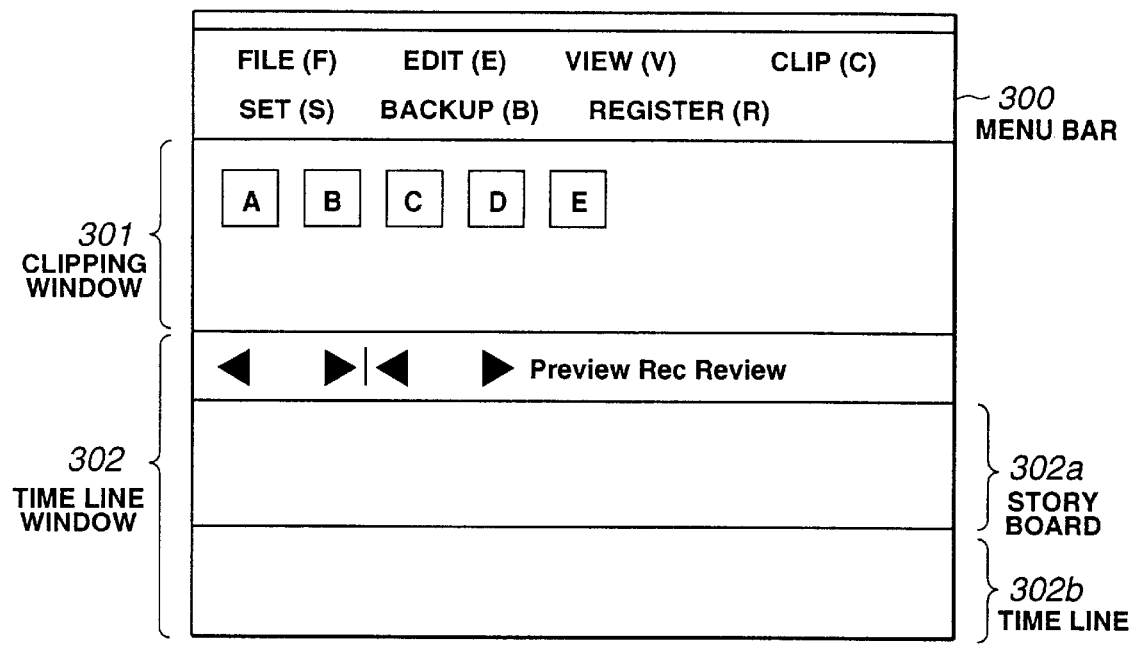
FIG. 36 is a view showing the editing screen on the display section where a simplified index picture and a pull-down menu are displayed in a clipping window.
Figure 36B:
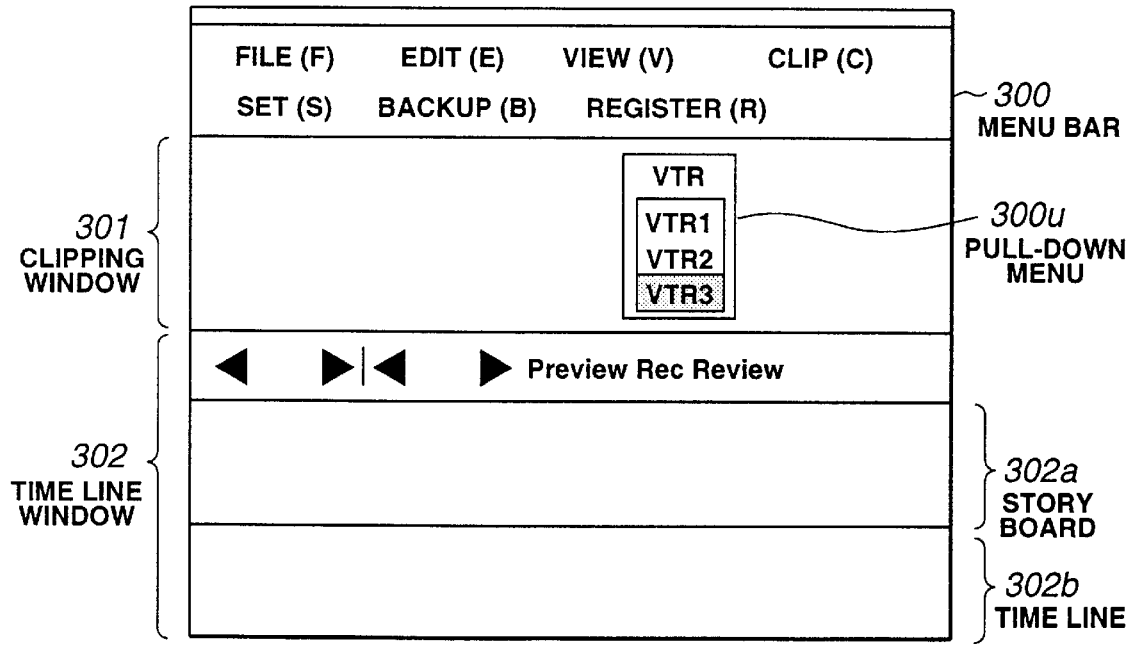

As a frame of index picture information corresponding to a video material to be edited is selected by the operating section 1100 after the contents of the digital video cassette 12 set in the digital video cassette recorder 13 are read into the editing device 14, as described above, the corresponding index picture information is read out from the external storage unit 1309 of the entire system control section 1300 and transferred to the display section 1200 (step S5). As shown in FIGS. 36(a) and 36(b), corresponding individual simplified index pictures are arrayed and displayed in the clipping window 301. If a large number of simplified index pictures are included in the selected frame, the screen of the clipping window 301 is laterally scrolled to display these simplified index pictures.

Figure 39:
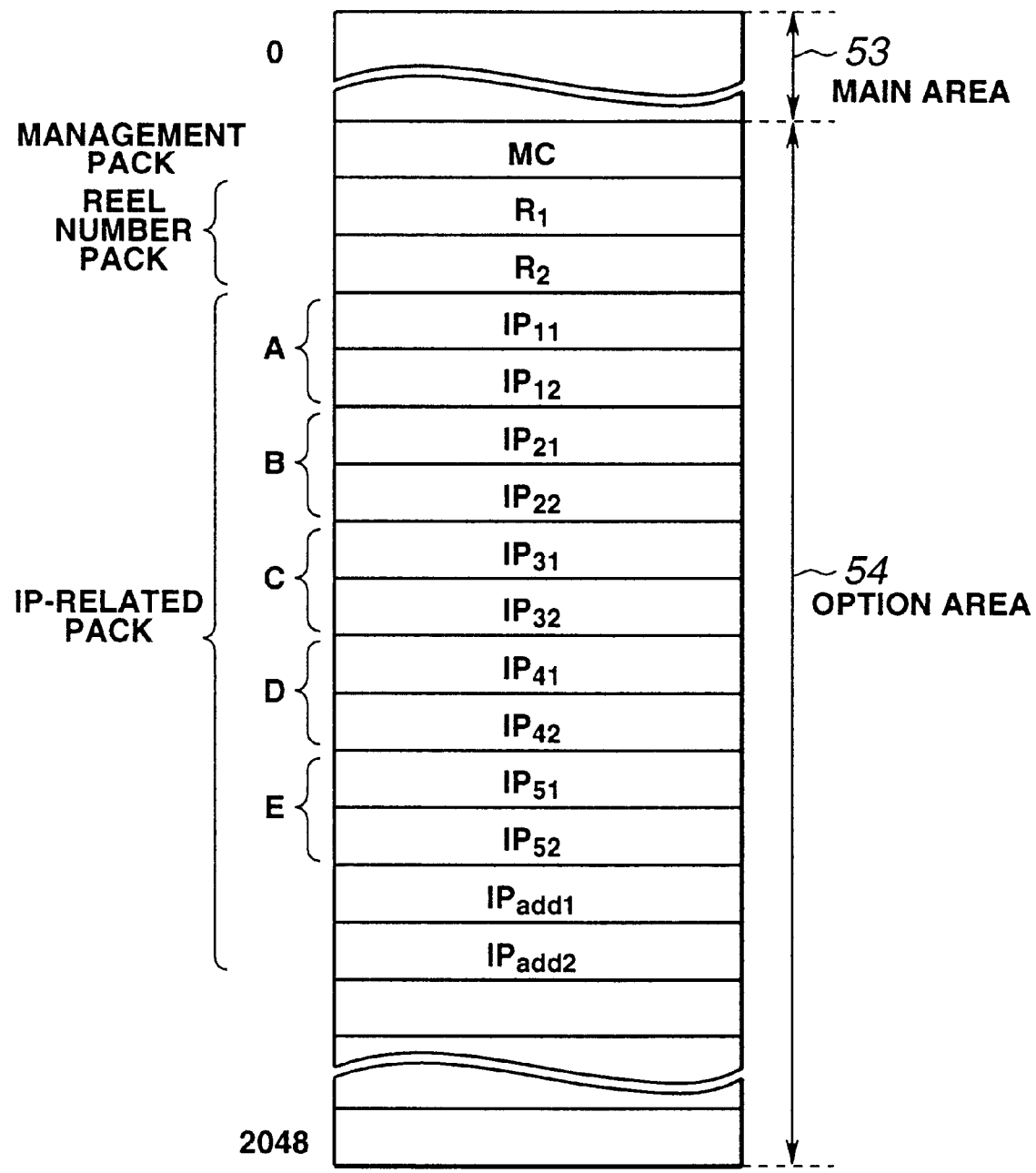
FIG. 39 is a view showing an example of pack data before editing, stored in a memory of the entire system control section.
Figure 41:
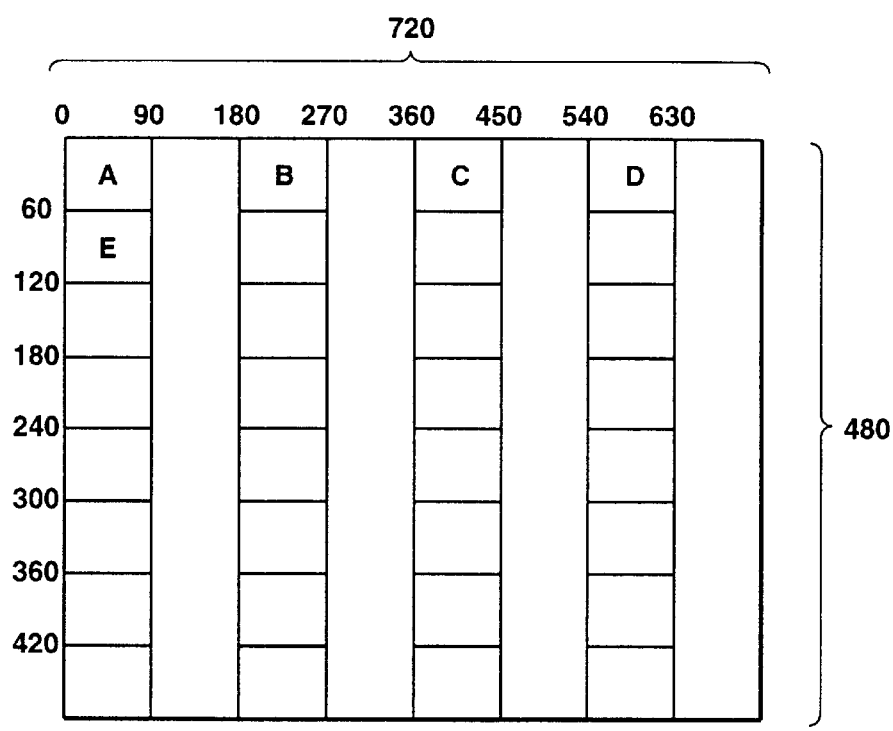
FIG. 41 is a view showing an example of an index picture aggregate screen before editing, expressed by index picture information stored in the memory of the entire system control section.

The example shown in FIGS. 36(a) and 36(b) corresponds to the case where the initial data contents read from the cassette-appendant memory 16 of the digital video cassette 12 are as shown in FIG. 39 while the contents of initial index picture information is as shown in FIG. 41. In this example, as shown in FIG. 39, plural sets of packs from the pack IP 11, IP12 corresponding to a simplified index picture A up to packs IP51, IP52 corresponding to a simplified index picture E are recorded in this order in the IP-related pack area of the cassette-appendant memory 16. Also, as shown in FIG. 41, the frame of index picture information (aggregate screen of simplified index pictures) includes the individual simplified index picture information in the order of A to E. For example, the simplified index picture A is prepared on the basis of the packs IP11, IP12 of FIG. 39, in the digital video cassette recorder 13. The other simplified index pictures B to E are prepared similarly.

To display the simplified index picture as shown in FIG. 36(a) before editing, the operating section 1100 is operated to select a predetermined item on the menu bar, thus selecting the predetermined digital video cassette recorder 13 from the selection pull-down menu, as shown in FIG. 36(b).

At step S6, the index picture (simplified index picture) displayed in the clipping window 301 or displayed in the time line window 302 is selected.

When the index picture is selected by operating the operating section 1100, for example, by clicking a click area on a right shoulder portion of the displayed index picture, the entire system control section 1300 reproduces a scene corresponding to the selected index picture from the digital video tape cassette 12 by using a tape reproducing section 3a, and up-loads the reproduced scene to the above-described disc unit 1700, at step S7.

When the operator clicks "CLIP(C)" on the menu bar 300 of FIG. 35 by using the mouse or the like, the entire system control section 1300 determines that the IP editing mode has been selected, and confirms the change of state on the story board 302a of the time line window 302.

Figure 37:
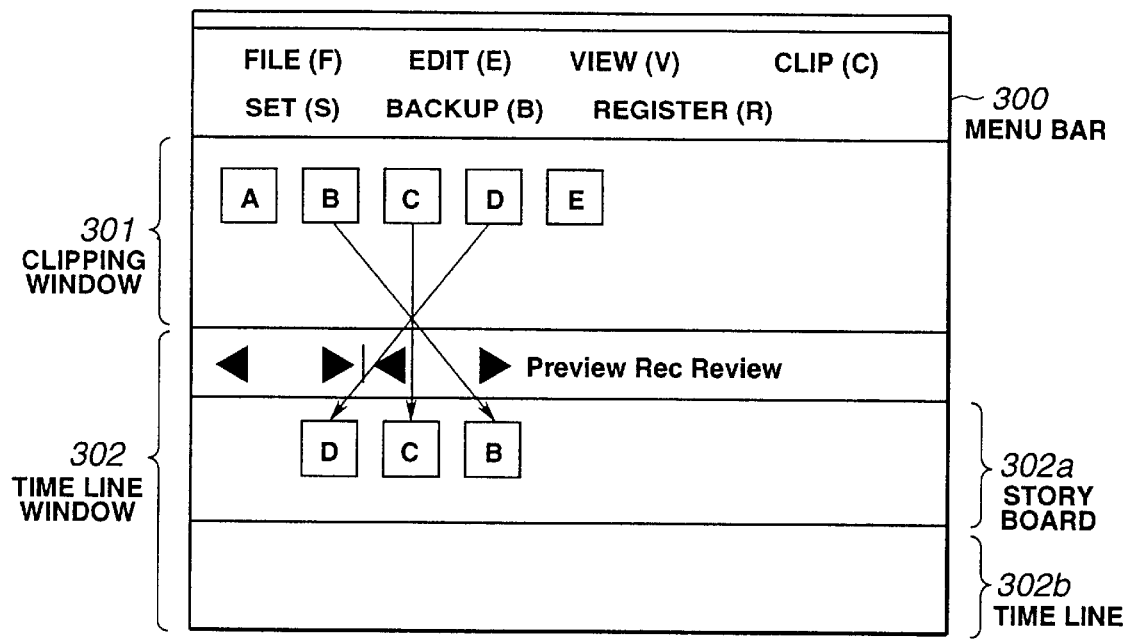
FIG. 37 is a view for explaining the operation of the entire system control section in the case where an operator has selected "SET (S)" on a menu bar.

For example, if the operator clicks the simplified index picture D in the clipping window 301 and then clicks an arbitrary position on the story board 302a of the time line window 302, the simplified index picture at the corresponding position is displayed, as shown in FIG. 37. By carrying out similar procedures with respect to the simplified index pictures B and C, the simplified index pictures are displayed in the order of D, C and B on the story board 302a.

Figure 40:
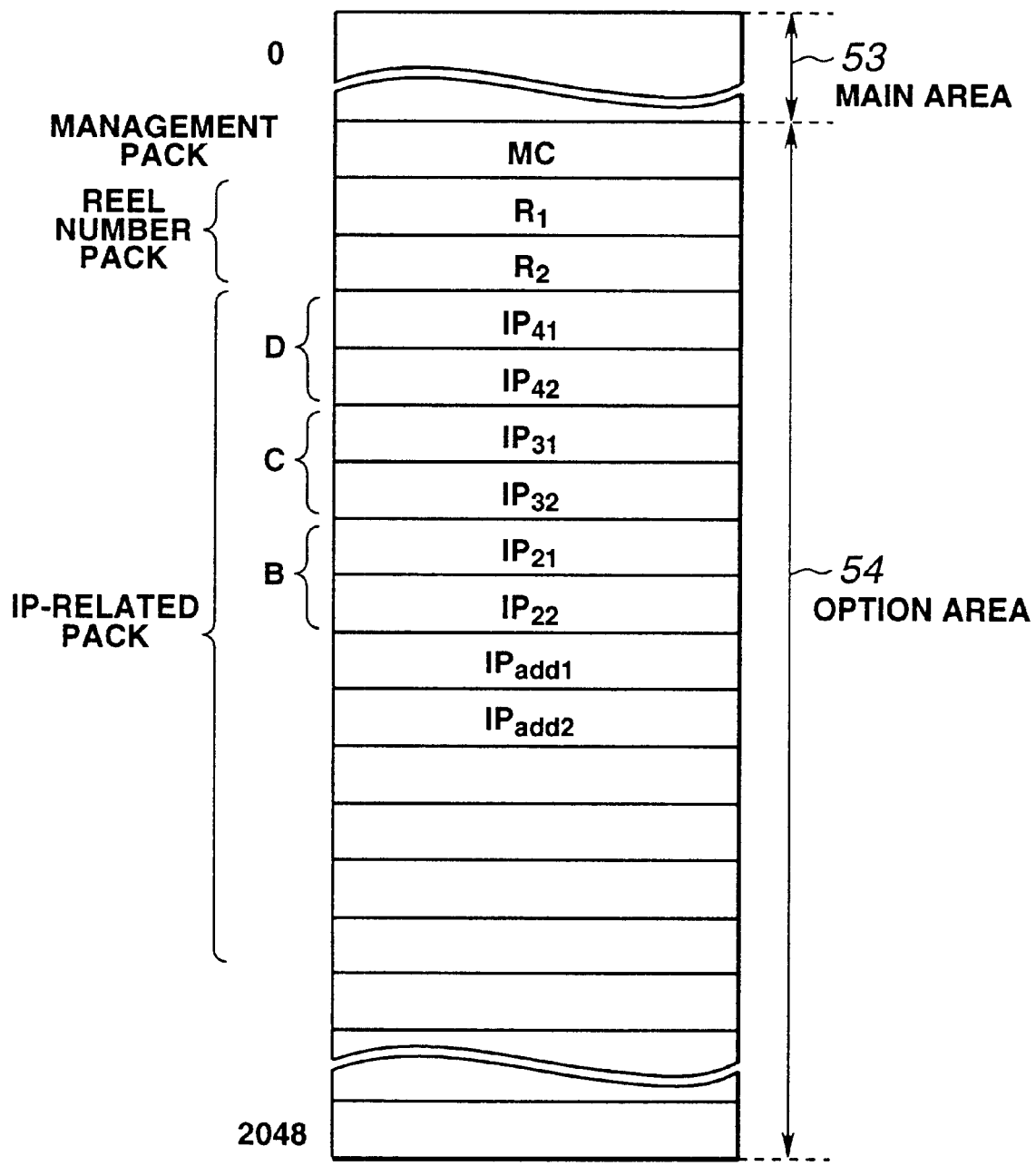
FIG. 40 is a view showing an example of the pack data after editing, stored in the memory of the entire system control section.
Figure 42:
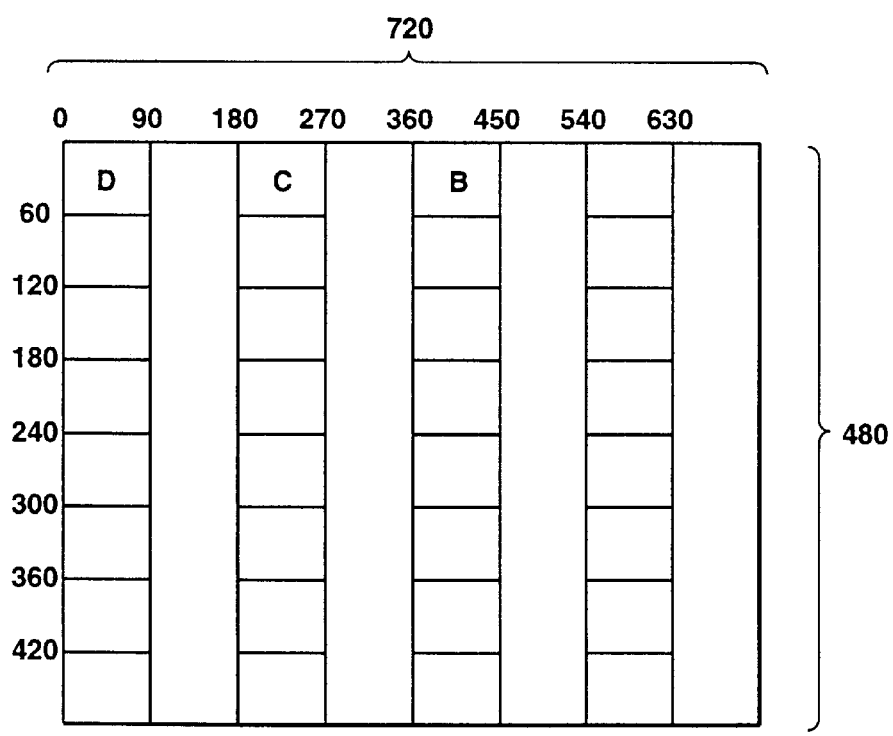
FIG. 42 is a view showing an example of the index picture aggregate screen after editing, expressed by the index picture information stored in the memory of the entire system control section.

On confirming such change of state on the story board 302a, the entire system control section 1300 reads out the IP-related pack data (FIG. 39) from the external storage unit 1309 into the memory 1304 (FIG. 30) of the entire system control section 1300, and relocates the contents into the order (D, C and B) as shown in FIG. 40. At the same time, the entire system control section 1300 reads out the index picture information (FIG. 41) from the external storage unit 1309 into the memory 1304, and relocates the contents in the order (D, C and B) as shown in FIG. 42. These index pictures are transferred again to the external storage unit 1309, and then written and registered.

Figure 38:
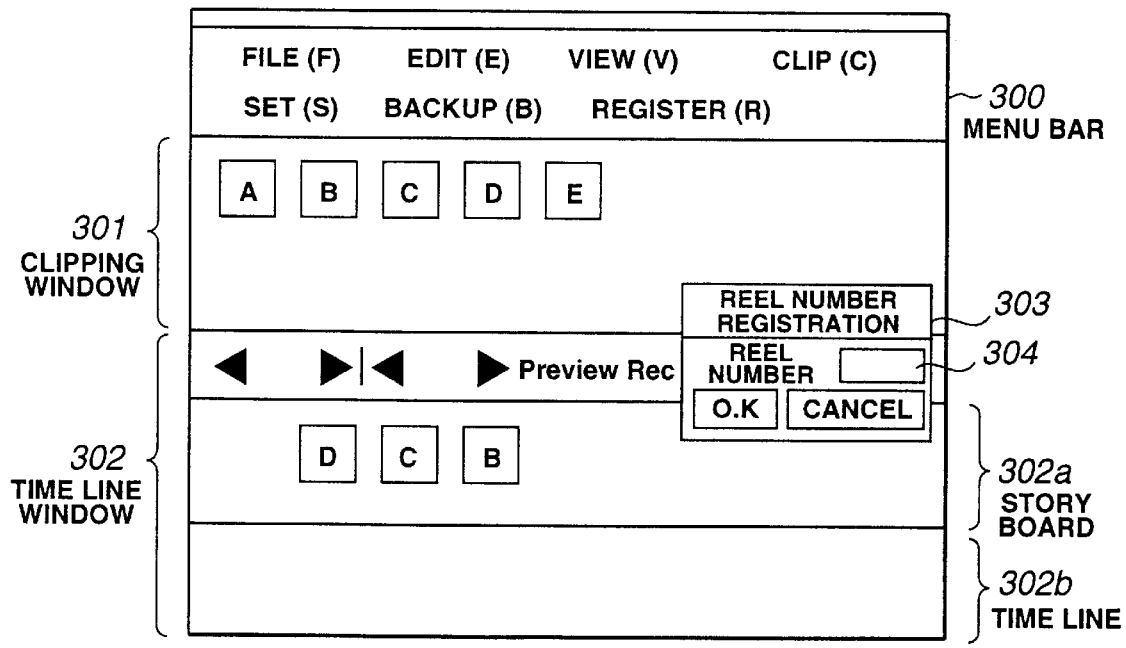
FIG. 38 is a view showing a reel number registration window displayed by the operator selecting "SET (S)" on the menu bar.

On the other hand, in FIG. 37, if the operator clicks "SET (S)" on the menu bar 300 of FIG. 36 by using the mouse of the operating section 1100, the entire system control section 1300 determines that the reel number setting mode has been selected, and displays a reel number registration window 303 by the GUI of the display section 1200 as shown in FIG. 38, thus prompting input of a reel number. If a reel number consisting of eight digits of alpha-numeric characters is inputted to a reel number input area 304 and then "O.K." is clicked, the reel number is registered to the external storage unit 1309 of the entire system control section 1300.

In FIG. 36(a), if the operator clicks "BACKUP (B)" on the menu bar 300 by using the mouse of the operating section 1100, the entire system control section 1300 determines that the backup mode has been selected, and confirms the change of state on the story board 302a of the time line window 302.

Figure 43:
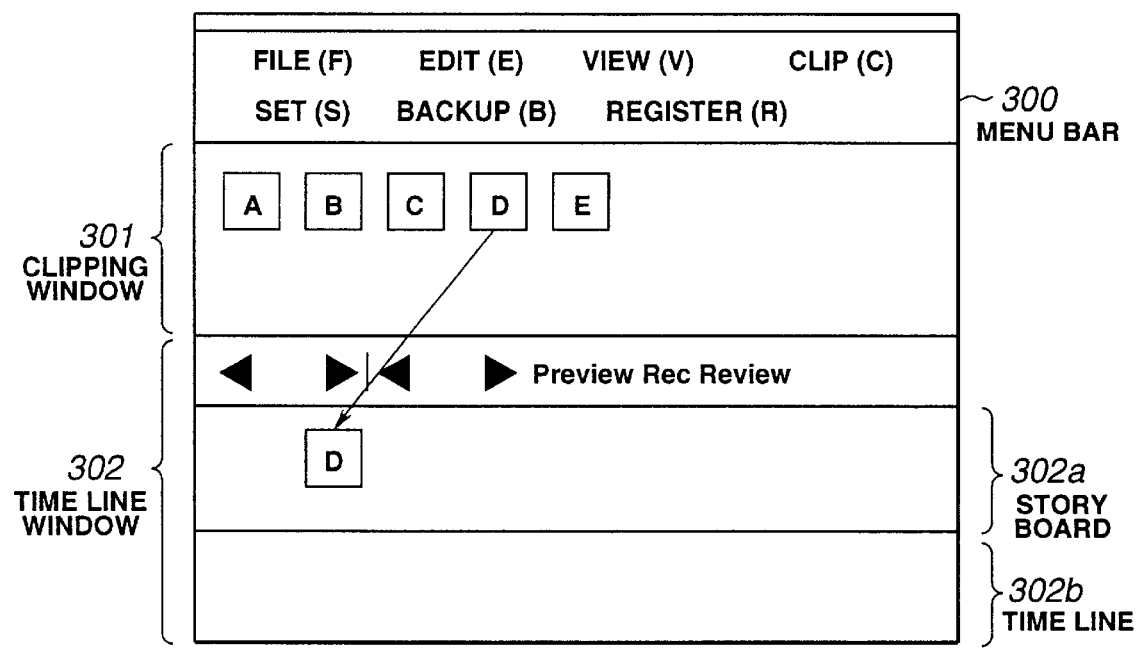
FIG. 43 is a view showing another example of the screen displayed on the display section.
Figure 44:
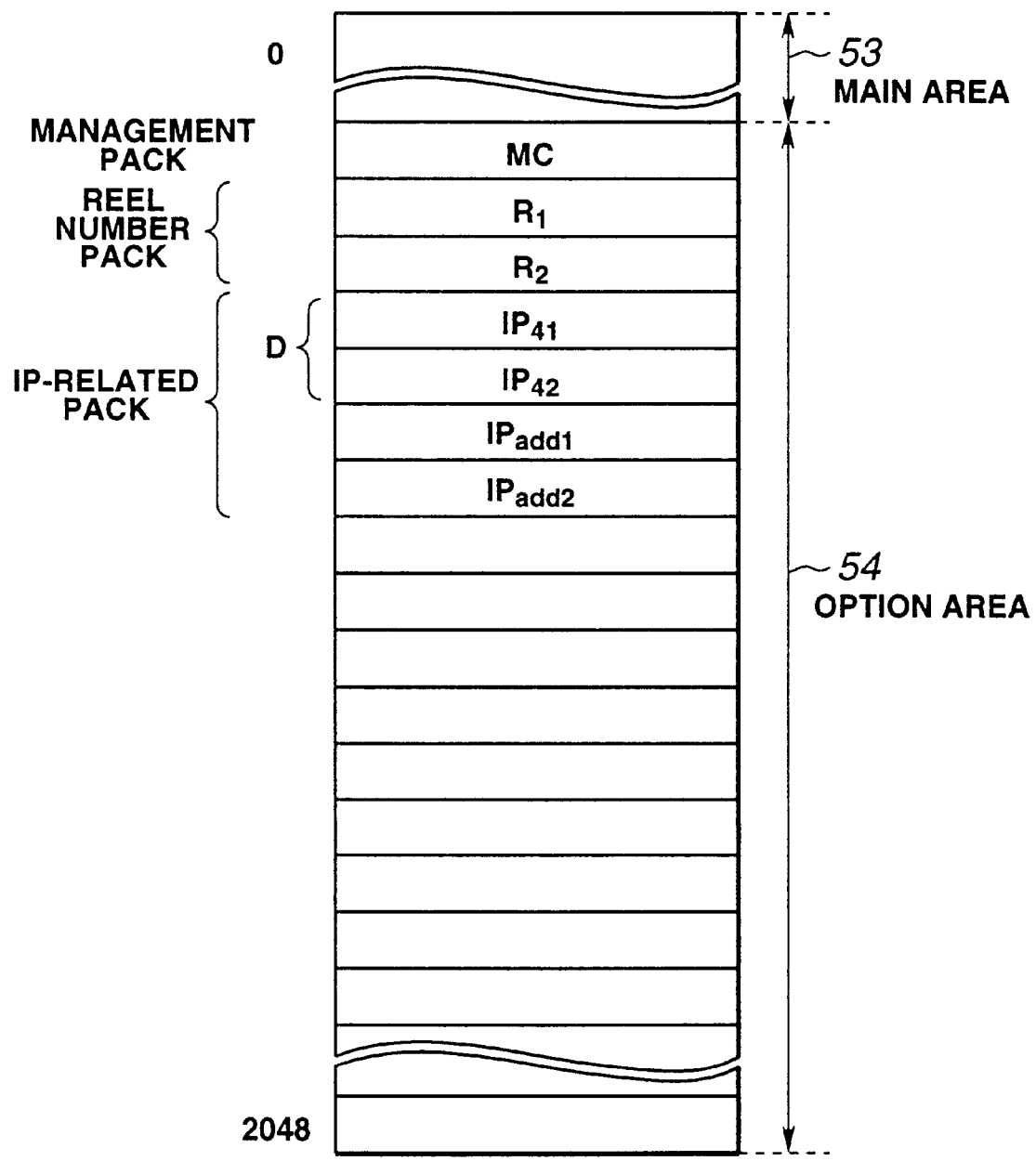
FIG. 44 is a view showing an example of the pack data at the time of backup, stored in the memory of the entire system control section.

For example, in the case where the simplified index picture D is to be backed up, the simplified index picture D in the clipping window 301 is clicked, and then an arbitrary position on the story board 302a of the time line window 302 is clicked, as shown in FIG. 43. Thus, the simplified index picture D is displayed at the corresponding position.

Figure 45:
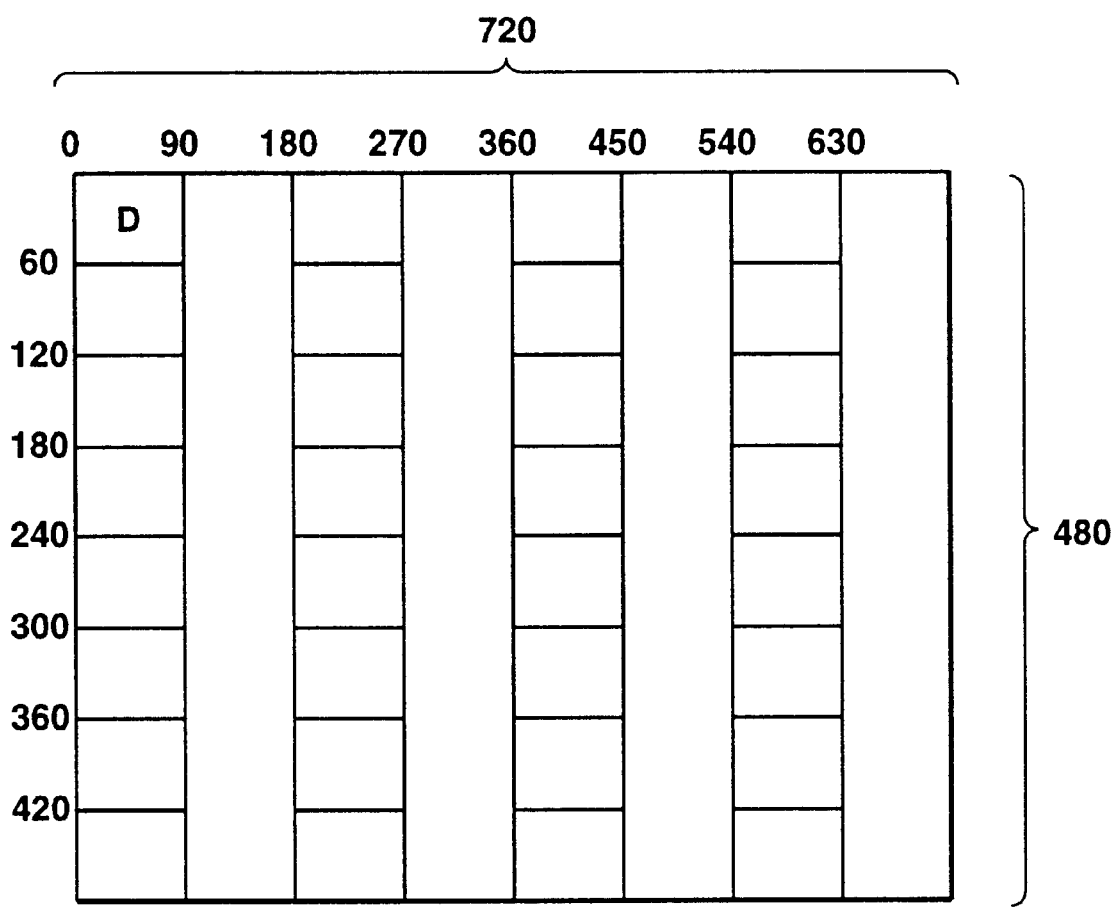
FIG. 45 is a view showing the index picture aggregate screen at the time of backup, expressed by the index picture information stored in the memory of the entire system control section.

On confirming such change of state on the story board 302a, the entire system control section 1300 carries out processing similar to that of the IP editing mode. That is, the entire system control section 1300 reads out the IP-related pack data from the external storage unit 1309 of the entire system control section 1300 into the memory 1304, and changes the contents from the packs corresponding to the simplified index pictures A, B, C, D and E shown in FIG. 39 to only packs IP41, IP42 corresponding to the simplified index picture D shown in FIG. 44. At the same time, the entire system control section 1300 reads out the index picture information from the external storage unit 1309 to the memory 1304, and changes the contents to be only the simplified index picture D as shown in FIG. 45. Then, these data are transferred again to the external storage unit 1309, and then written and registered.

After that, at step S8, as the editor carries out temporary editing by using the time line 302b while displaying on the story board 302a the index pictures of individual scenes uploaded to the disc unit 1700, an editing control section 10 prepares the editing data which may be referred to as the project file.

Figure 46:
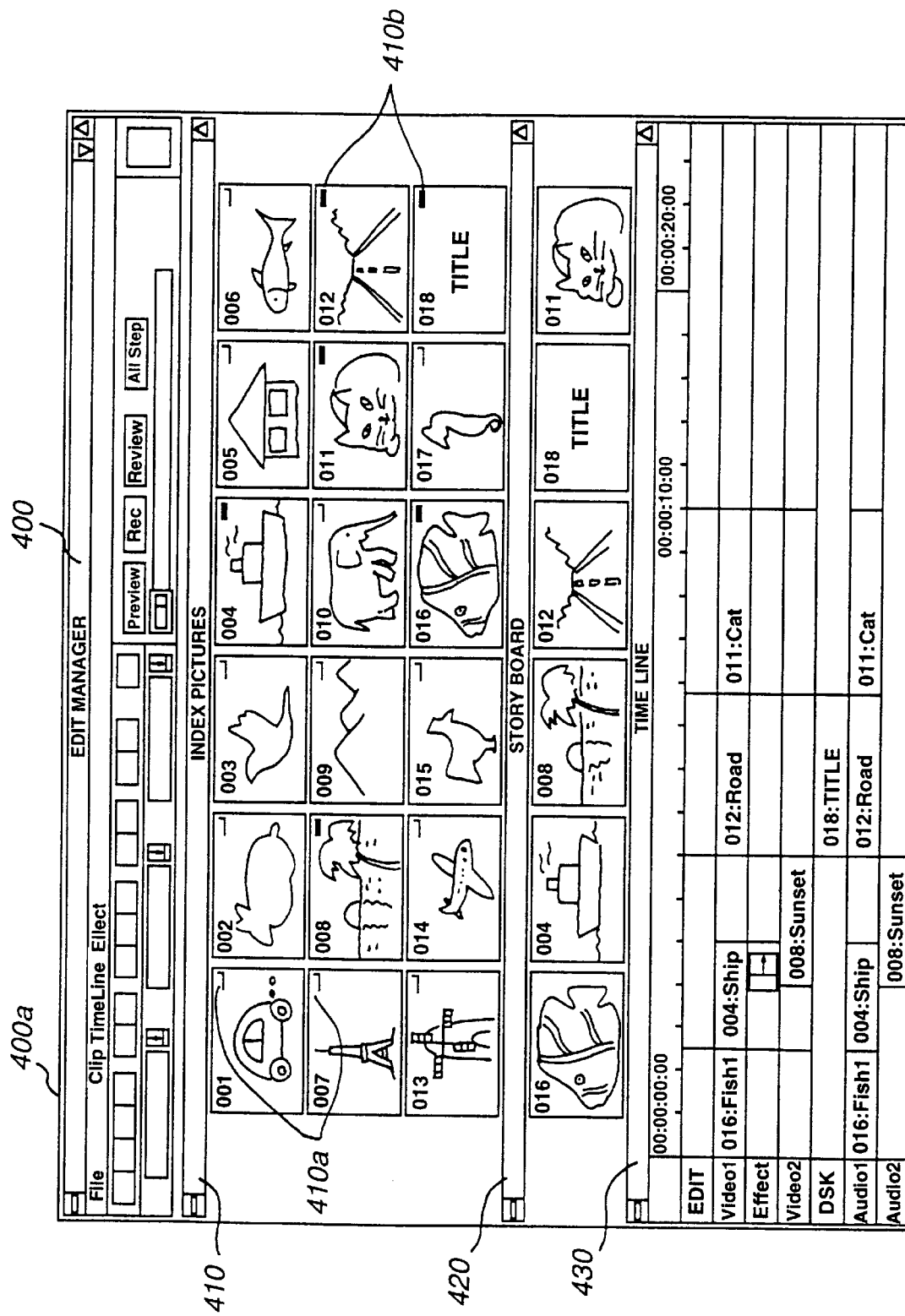
FIG. 46 is a view showing an example of the screen displayed on the display section of FIG. 29.

Temporary editing will now be described with reference to FIG. 46. The screen displayed in FIG. 46 is to be displayed on the display section 1200. If "EDIT" on the menu bar 300 of FIG. 37 is selected by the operating section 1100, the screen of FIG. 46 is displayed. As shown in FIG. 46, this screen includes an edit manager 400, an index picture 410, a story board 420, and a time line 430. Temporary editing is actually carried out on this editing screen. FIG. 46 shows an example in which work is carried out on the time line 430 since index pictures (simplified index pictures) 004, 008, 011, 012, 016 and 018 may be relocated on the story board 420 in accordance with the editing order.

First, after the scene of Fish 1 of the index picture 016 (hereinafter referred to as 016:Fish1) is projected for 2.6 seconds along with audio signals, the scene of 004:Ship is caused to continue together with audio signals. At the time when 4.2 seconds have lapsed, the scene of 008:Sunset is wiped while audio signals are faded. Then, at the time when 7.1 seconds have lapsed, still picture keying (DSK) of 018:TITLE is carried out on the scene of 012:Road, while the picture is continuously projected up to 10.8 seconds together with audio signals. Then, after 10.8 seconds, the scene of 011:Cat is continuously projected together with audio signals.

In the case where the editing data thus obtained is used as temporary editing data as described above, the editing control section 10 prepares an EDL from the editing data at step S9. This may be easily realized by using predetermined software. The editor may carry out main editing by using the EDL at step S10.

More specifically, a target material for editing (such as keying) is added to the memory 1304 of the entire system control section 1300, and the material is transferred to the video special effect section 3100 and the audio mixer 3200, where various video and audio special effects are made. For example, an editing command, and identification information of each index picture, that is, information stored in the cassette-appendant memory (also information stored in the external storage unit 1309) of scene number and disc number, are displayed on the time line 430 where the target material is selected, by operating the operating section 1100 on the edit manager 400 of the editing screen. Thus, special effects are made, and the material is displayed on the time line in the transmission order. The transmission time displayed on the time line 430, the identification information of the index pictures, and information indicating the special effect editing are calculated by the CPU section 1303 of the entire system control section 1300 and stored in the external storage unit 1309.

This stored information, that is, the editing data, is controlled by the CPU section 1303 and transferred to the external recording section 1900 through the I/F section 1307.

The transferred data is recorded from the external recording section 1900 to the external recording medium 2000 under the control of the entire system control section 1300, that is, under the control of the CPU section 1303.

On the side of a digital video cassette recorder for master tape preparation 2100, another digital video cassette (such as a master tape) for recording edited data is set in advance. On completion of preparation of the digital video cassette recorder 13, the external recording medium 2000 is inserted so that the editing data is read. Following this editing data, a material to be actually broadcast is prepared along the contents of the editing data on the master tape 2200. That is, the editing data prepared by the editing device 14 and recorded on the external recording medium 2000 becomes the edit decision list (EDL). As the external recording medium 2000, a portable medium such as a floppy disc is selected.

Thus, since the editing system collectively displays index pictures of individual scenes or takes on the display section 1200 and enables automatic up-loading of the scene of the selected index picture, the portion to be up-loaded may be designated in a short period of time. Also, the EDL may be easily obtained from the editing data which is provided by using the story board and the time line.

Although the above-described video editing system 1 uses the HDD 7 as a temporary recording medium, an optical disc drive or a large-capacity semiconductor memory may be used.

The editing device and method according to the present invention enables preparation of a list of editing scenes, by relocating tape position information read out from the tape cassette having the memory for storing the tape position information of leading and terminating ends of each scene on the tape.

Also, with the editing device and method according to the present invention, in carrying out editing processing by using the tape cassette in which the recording space collectively recording therein index pictures as leading video data of plural scenes is provided on the tape and which has the memory for storing tape position information of leading and terminating ends of each scene and tape position information of the index picture and the recording space, each tape position information is read from the memory, and the tape is caused to travel on the basis of the tape position information of the recording space so as to read each index picture in the recording space. Then, a desired index picture is selected from the index pictures displayed on the display section. Thus, the portion to be up-loaded may be designated in a short period of time.

What is claimed is:

1. An editing device comprising:

reading means for reading data including video data and audio data recorded on a tape-like recording medium of a tape cassette, and reading position information of at least the video data of the data including the video data and the audio data stored in temporary storage means of the tape cassette;

index preparation means for preparing and editing an index of said video data and said audio data by relocating index pictures representative of a portion of said video data recorded on said tape-like recording medium of said tape cassette that corresponds to said position information of each of said index pictures;

wherein index preparation takes place by utilizing a direct current component of each block of subcode data and is carried out by discrete cosine transform processing on a block basis of a predetermined size; and editing processing means for editing the data including the video data and the audio data read by the reading means by selecting one or more of said index pictures, whereon the selection of each of said index pictures updates said position information of the video data so as to prepare updated editing data.

2. The editing device as claimed in claim 1, wherein at least video data of a start frame and/or an end frame of predetermined units of video data consisting of plural frames are recorded together with the data on the tape-like recording medium of the tape cassette, and wherein position information of the start frame and/or the end frame is recorded together with the position information in the temporary storage means of the tape cassette, the reading means including first reading means for reading the video data of the start frame and/or the end frame together with the data recorded on the tape-like recording medium of the tape cassette, and second reading means for reading the position information of the start frame and/or the end frame together with the position information stored in the temporary storage means of the tape cassette, the editing processing means carrying out editing at least with the video data of the start frame and/or the end frame read by the first reading means, the editing processing means relocating at least the position information of the start frame and/or the end frame read by the second reading means or relocating the position information of the start frame and/or the end frame while newly preparing position information so as to prepare the editing data.

3. The editing device as claimed in claim 2, wherein the editing processing means relocates the video data of the start frame and/or the end frame read by the first reading means so as to carry out editing.

4. The editing device as claimed in claim 1, further comprising:

a non-linearly accessible recording medium;

data recording means for recording the data read by the reading means onto the non-linearly accessible recording medium;

temporary recording means; and position information recording means for recording the position information read by the reading means onto the temporary recording means.

5. The editing device as claimed in claim 1, further comprising special effect processing means for making a special effect on the video data read by the reading means.

6. An editing system comprising:

a reproducing device for reproducing data including video data and audio data recorded on a tape-like recording medium of a tape cassette, and reproducing position information of at least the video data of the data including the video data and the audio data stored in temporary storage means of the tape cassette;

an index preparation section for preparing and editing an index of said video data and said audio data by relocating index pictures representative of a portion of said video data recorded on said tape-like recording medium of said tape cassette that corresponds to said position information of each of said index pictures;

wherein index preparation takes place by utilizing a direct current component of each block of subcode data and is carried out by discrete cosine transform processing on a block basis of a predetermined size; and an editing device comprising reading means for reading the data reproduced from the reproducing device and reading the position information of at least the video data of the data including the video data and the audio data reproduced from the reproducing device, and editing processing means for editing the data including the video data and audio data read by the reading means by selecting one or more of said index pictures, whereon the selection of each of said index pictures updates said position information of the video data so as to prepare updated editing data, and;

a transmission material preparing device supplied with the editing data prepared by the editing processing means and preparing video and audio transmission materials.

7. The editing system as claimed in claim 6, wherein at least video data of a start frame and/or an end frame of predetermined units of video data consisting of plural frames are recorded together with the data on the tape-like recording medium of the tape cassette, and wherein position information of the start frame and/or the end frame is recorded together with the position information in the temporary storage means of the tape cassette, the reading means of the editing device including first reading means for reading the video data of the start frame and/or the end frame of the predetermined units of video data consisting of plural frames together with the data reproduced from the reproducing device, and second reading means for reading the position information of the start frame and/or the end frame together with the position information reproduced from the reproducing device, the editing processing means of the editing device carrying out editing at least with the video data of the start frame and/or the end frame read by the first reading means, the editing processing means relocating at least the position information of the start frame and/or the end frame read by the second reading means or relocating the position information of the start frame and/or the end frame while newly preparing position information so as to prepare the editing data.

8. The editing system as claimed in claim 7, wherein the editing processing means of the editing device relocates the video data of the start frame and/or the end frame read by the first reading means so as to carry out editing.

9. The editing system as claimed in claim 6, wherein the editing device further comprises:
 a non-linearly accessible recording medium;
 data recording means for recording the data read by the reading means onto the non-linearly accessible recording medium;
 temporary recording means; and
 position information recording means for recording the position information read by the reading means onto the temporary recording means.

10. The editing system as claimed in claim 6, further comprising special effect processing means for making a special effect on the video data read by the reading means.

11. An editing method comprising the steps of:
 reading data including video data and audio data recorded on a tape-like recording medium of a tape cassette, and reading position information of at least the video data of the data including the video data and the audio data stored in temporary storage means of the tape cassette;
 preparing and editing an index of said video data and said audio data by relocating index pictures representative of a portion of said video data recorded on said tape-like recording medium of said tape cassette that corresponds to said position information of each of said index pictures;
 wherein index preparation takes place by utilizing a direct current component of each block of subcode data and is carried out by discrete cosine transform processing on a block basis of a predetermined size; and
 editing the data including the video data and the audio data read at the reading data step by selecting one or more of said index pictures, whereon the selection of each of said index pictures updates said position information of the video data so as to prepare updated editing data.

12. The editing method as claimed in claim 11, wherein at least video data of a start frame and/or an end frame of predetermined units of video data consisting of plural frames are recorded together with the data on the tape-like recording medium of the tape cassette, and wherein position information of the start frame and/or the end frame is recorded together with the position information in the temporary storage means of the tape cassette,
 the first step including a first reading step of reading the video data of the start frame and/or the end frame together with the data recorded on the tape-like recording medium of the tape cassette, and a second reading step of reading the position information of the start frame and/or the end frame together with the position information stored in the temporary storage means of the tape cassette,
 the second step including the step of carrying out editing at least with the video data of the start frame and/or the end frame read at the first reading step, and relocating at least the position information of the start frame and/or the end frame read at the second reading step or relocating the position information of the start frame and/or the end frame while newly preparing position information so as to prepare the editing data.

13. The editing method as claimed in claim 12, wherein the second step including the step of relocating the video data of the start frame and/or the end frame read at the first reading step so as to carry out editing.

14. An editing method comprising the steps of:
 reproducing data including video data and audio data recorded on a tape-like recording medium of a tape cassette, and reproducing position information of at least the video data of the data including the video data and the audio data stored in temporary storage means of the tape cassette;
 reading the data reproduced at the reproducing data step and reading the position information of at least the video data of the data including the video data and the audio data reproduced at the reproducing data step;
 preparing and editing an index of said video data and said audio data of the reading data step by relocating index pictures representative of a portion of said video data recorded on said tape-like recording medium of said tape cassette that corresponds to said position information of each of said index pictures;
 wherein index preparation takes place by utilizing a direct current component of each block of subcode data and is carried out by discrete cosine transform processing on a block basis of a predetermined size;
 editing the data read at the preparing and editing step, by selecting one or more of said index pictures, whereon the selection of each of said index pictures updates said position information of the video data so as to prepare updated editing data; and
 preparing video and audio transmission materials from the editing data prepared at the editing step.

15. The editing method as claimed in claim 14, wherein at least video data of a start frame and/or an end frame of predetermined units of video data consisting of plural frames are recorded together with the data on the tape-like recording medium of the tape cassette, and wherein position information of the start frame and/or the end frame is recorded together with the position information in the temporary storage means of the tape cassette,
 the second step including a first reading step of reading the video data of the start frame and/or the end frame of the predetermined units of video data consisting of plural frames together with the data reproduced at the first step, and a second reading step of reading the position information of the start frame and/or the end frame stored in the temporary storage means of the tape cassette together with the position information reproduced at the first step,
 the third step including the step of carrying out editing at least with the video data of the start frame and/or the end frame read at the first reading step, and relocating at least the position information of the start frame and/or the end frame read at the second reading step or relocating the position information of the start frame and/or the end frame while newly preparing position information so as to prepare the editing data.

* * * * *